(12) United States Patent
Yahia et al.

(10) Patent No.: US 9,075,846 B2
(45) Date of Patent: Jul. 7, 2015

(54) METHOD FOR RETRIEVAL OF ARABIC HISTORICAL MANUSCRIPTS

(71) Applicant: KING FAHD UNIVERSITY OF PETROLEUM AND MINERALS, Dhahran (SA)

(72) Inventors: Mohammad Husni Najib Yahia, Al-Ahsaa (SA); Wasfi G. Al-Khatib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 265 days.

(21) Appl. No.: 13/712,773

(22) Filed: Dec. 12, 2012

(65) Prior Publication Data
US 2014/0164370 A1    Jun. 12, 2014

(51) Int. Cl.
*G06F 17/30* (2006.01)

(52) U.S. Cl.
CPC .... *G06F 17/30528* (2013.01); *G06F 17/30705* (2013.01)

(58) Field of Classification Search
CPC .......... G06F 17/3071; G06F 17/30707; G06F 17/30705; G06F 17/30528
USPC ........................................ 707/730; 704/1–10
See application file for complete search history.

(56) References Cited

U.S. PATENT DOCUMENTS

| | | | |
|---|---|---|---|
| 4,602,163 A * | 7/1986 | Pryor | 250/559.33 |
| 4,839,853 A | 6/1989 | Deerwester et al. | |
| 5,083,378 A * | 1/1992 | Juday | 33/1 D |
| 7,024,400 B2 * | 4/2006 | Tokuda et al. | 706/56 |
| 7,113,943 B2 | 9/2006 | Bradford et al. | |
| 7,533,094 B2 * | 5/2009 | Zhang et al. | 1/1 |
| 7,630,992 B2 | 12/2009 | Martin et al. | |
| 7,720,792 B2 * | 5/2010 | Price | 707/739 |
| 8,040,824 B2 * | 10/2011 | Liu et al. | 370/256 |
| 8,239,334 B2 * | 8/2012 | Yan et al. | 706/16 |
| 2002/0174120 A1 * | 11/2002 | Zhang et al. | 707/7 |
| 2004/0170327 A1 * | 9/2004 | Kim et al. | 382/217 |
| 2005/0004448 A1 * | 1/2005 | Gurr et al. | 600/420 |
| 2005/0201405 A1 * | 9/2005 | Liu et al. | 370/432 |

(Continued)

FOREIGN PATENT DOCUMENTS

| WO | WO 2007/064375 A2 | 6/2007 |
|---|---|---|
| WO | WO 2008/069791 A1 | 6/2008 |

OTHER PUBLICATIONS

Arabic Phonetic Dictionaries for Speech Recognition, Mohamed Ali et al., 2009.*

(Continued)

*Primary Examiner* — Jean M Corrielus
(74) *Attorney, Agent, or Firm* — Richard C Litman

(57) ABSTRACT

The method for retrieval of Arabic historical manuscripts using Latent Semantic Indexing approaches the problem of manuscripts indexing and retrieval by automatic indexing of Arabic historical manuscripts through word spotting, using "Text Image" similarity of keywords. The similarity is computed using Latent Semantic Indexing (LSI). The method involves a manuscript page preprocessing step, a segmentation step, and a feature extraction step. Feature extraction utilizes a circular polar grid feature set. Once the salient features have been extracted, indexing of historical Arabic manuscripts using LSI is performed in support of content-based image retrieval (CBIR).

13 Claims, 35 Drawing Sheets

(56) References Cited

U.S. PATENT DOCUMENTS

| | | | |
|---|---|---|---|
| 2005/0228778 A1* | 10/2005 | Perrone | 707/3 |
| 2009/0157601 A1* | 6/2009 | Lee et al. | 707/2 |
| 2009/0268733 A1* | 10/2009 | Liu et al. | 370/390 |
| 2010/0161596 A1* | 6/2010 | Yan et al. | 707/723 |
| 2012/0191632 A1* | 7/2012 | Chen et al. | 706/12 |

OTHER PUBLICATIONS

Improving the Arabic Pronunciation Dictionary for Phone and Word Recognition with Linguistically-Based Pronunciation Rules, Fadi Biadsy et al., Jun. 2009.*

Natural Speaker-Independent Arabic Speech Recognition System Based on Hidden Markov Models Using Sphinx Tools, Mohammad A, et al., May 2010.*

Morphological Decomposition for Arabic Broadcast News Transcription, Bing Xiang et al., IEEE, 2006.*

Sami Brandt; Jorma Laaksonen and Erkki Oja, "Statistical Shape Features in Content-Based Image Retrieval", Proceedings of ICPR2000, Barcelona, Spain, Sep. 2000.

Yang Mingqiang, Kpalma Kidiyo and Ronsin Joseph, "A Survey of Shape Feature Extraction Techniques", Pattern Recognition Techniques, Technology and Applications Nov. 2008.

Sameer Antani, Rangachar Kasturi, Ramesh Jain, "A survey on the use of pattern recognition methods for abstraction, indexing and retrieval of images and video", Pattern Recognition (2002) pp. 945-965.

S.A. Shahab, Wasfi G. Al-Khatib, Sabri A. Mahmoud, "Computer Aided Indexing of Historical Manuscripts", Proceedings of the International Conference on Computer Graphics, Imaging and Visualisation (CGIV'06) (2006).

* cited by examiner

*Fig. 2*

$$A = \begin{pmatrix} 0.22 & 0.34 & 0.08 \\ 0.17 & 0.05 & 0.34 \\ 0 & 0.14 & 0 \\ 0 & 0.10 & 0 \\ 0.12 & 0.11 & 0.23 \\ 0.27 & 0.20 & 0.12 \\ 0.07 & 0 & 0.12 \\ 0.12 & 0.02 & 0.09 \end{pmatrix} \overbrace{\phantom{xxxxxxxxxxxxxx}}^{300a}$$

(c4)   (c3)   (c2)   (c1)

قال النبي صلى الله عليه وسلم

| 1 | 1 | 1 | 1 | 0 | 0 | 0 | 1 | 1 | 1 | 1 | 1 | 0 | 0 | 0 |
|---|---|---|---|---|---|---|---|---|---|---|---|---|---|---|
| 1 | 1 | 1 | 1 | 0 | 0 | 0 | 1 | 1 | 1 | 1 | 1 | 0 | 0 | 0 |
| 1 | 1 | 1 | 1 | 0 | 0 | 0 | 1 | 1 | 1 | 1 | 1 | 0 | 0 | 0 |
| 1 | 1 | 1 | 1 | 0 | 0 | 0 | 1 | 1 | 1 | 1 | 1 | 0 | 0 | 0 |
| 1 | 1 | 1 | 1 | 0 | 0 | 0 | 1 | 1 | 1 | 1 | 1 | 1 | 0 | 0 |
| 1 | 1 | 1 | 1 | 0 | 0 | 0 | 0 | 1 | 1 | 1 | 1 | 1 | 0 | 0 |
| 1 | 1 | 1 | 1 | 0 | 0 | 0 | 0 | 1 | 1 | 1 | 1 | 1 | 0 | 0 |
| 1 | 1 | 1 | 1 | 0 | 0 | 0 | 0 | 1 | 1 | 1 | 1 | 1 | 0 | 0 |
| 1 | 1 | 1 | 1 | 0 | 0 | 0 | 0 | 1 | 1 | 1 | 1 | 1 | 0 | 0 |
| 1 | 1 | 1 | 1 | 0 | 0 | 0 | 0 | 1 | 1 | 1 | 1 | 0 | 0 | 0 |
| 1 | 1 | 1 | 0 | 0 | 0 | 0 | 0 | 0 | 1 | 1 | 1 | 0 | 0 | 0 |
| 1 | 1 | 1 | 0 | 0 | 0 | 0 | 1 | 0 | 0 | 1 | 1 | 1 | 0 | 0 | 0 |
| 1 | 0 | 0 | 0 | 0 | 1 | 1 | 1 | 0 | 1 | 1 | 0 | 0 | 0 | 0 |
| 0 | 0 | 0 | 0 | 0 | 1 | 1 | 1 | 0 | 0 | 0 | 0 | 0 | 0 | 0 |
| 0 | 0 | 0 | 0 | 0 | 1 | 1 | 1 | 0 | 0 | 0 | 0 | 0 | 0 | 0 |
| 0 | 0 | 0 | 0 | 0 | 1 | 1 | 1 | 0 | 0 | 0 | 0 | 0 | 0 | 1 |
| 0 | 0 | 0 | 0 | 0 | 0 | 1 | 1 | 1 | 1 | 1 | 1 | 1 | 1 | 1 |
| 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 0 | 1 | 1 | 1 | 0 | 0 | 0 |

| صلى الله عليه<br>Query word | صلى الله عليه<br>1 ✓ | صلى الله عليه<br>2 ✓ | صلى الله عليه<br>3 ✓ |
|---|---|---|---|
| صلى الله عليه<br>4 ✓ | صلى الله عليه<br>5 ✓ | صلى الله عليه<br>6 ✓ | صلى الله عليه<br>7 ✓ |
| صلى الله عليه<br>8 ✓ | صلى الله عليه<br>9 ✓ | صلى الله عليه<br>10 ✓ | صلى الله عليه<br>11 ✓ |
| صلى الله عليه<br>12 ✓ | صلى الله عليه<br>13 ✓ | صلى الله عليه<br>14 ✓ | صلى الله عليه<br>15 ✗ |
| صلى الله عليه<br>16 ✓ | صلى الله عليه<br>17 ✓ | صلى الله عليه<br>18 ✓ | صلى الله عليه<br>19 ✓ |
| صلى الله عليه<br>20 ✓ | صلى الله عليه<br>21 ✓ | صلى الله عليه<br>22 ✓ | ضى الله عنه<br>23 ✗ |

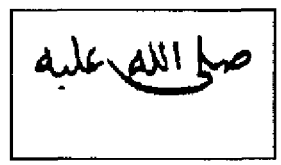

| عمر<br>Query word | عمر<br>1✓ | عمر<br>2✓ | عمر<br>3✓ |
|---|---|---|---|
| عمر<br>4✓ | عمر<br>5✓ | عمر<br>6✓ | عمر<br>7✓ |
| عمر<br>8✓ | عُمر<br>9✗ | عَمر<br>10✗ | عُمر<br>11✗ |
| عمر<br>12✓ | عمر<br>13✓ | عمر<br>14✓ | عمر<br>15✓ |
| بعمر<br>16✗ | عمر<br>17✓ | عمر<br>18✓ | عمر<br>19✓ |
| عمر<br>20✓ | بعمر<br>21✗ | بعمر<br>22✗ | عمر<br>23✓ |

| | | | |
|---|---|---|---|
| عمر Query word | عمر 1✓ | عمر 2✓ | عمر 3✓ |
| عمر 4✓ | عمر 5✓ | عمر 6✓ | عمر 7✓ |
| عمر 8✓ | عمر 9✓ | عتمر 10✗ | عتمر 11✗ |
| عتمر 12✗ | عمر 13✓ | عمر 14✓ | عمر 15✓ |
| بعمر 16✗ | بعمر 17✗ | عمر 18✓ | منز 19✗ |
| عمر 20✓ | عمر 21✓ | عمر 22✓ | قر 23✗ |

| صلى الله عليه<br>Query word | صلى الله عليه<br>1 ✓ | صلى الله عليه<br>2 ✓ | صلى الله عليه<br>3 ✓ |
|---|---|---|---|
| صلى الله عليه<br>4 ✓ | صلى الله عليه<br>5 ✓ | صلى الله عليه<br>6 ✓ | صلى الله عليه<br>7 ✓ |
| صلى الله عليه<br>8 ✓ | صلى الله عليه<br>9 ✓ | صلى الله عليه<br>10 ✓ | صلى الله عليه<br>11 ✓ |
| صلى الله عليه<br>12 ✓ | صلى الله عليه<br>13 ✓ | صلى الذي اغتسل<br>14 ✗ | ضي الله عنه<br>15 ✗ |
| صلى الله عليه<br>16 ✓ | ضى الله عنه<br>17 ✗ | عبد الله عن ابيه<br>18 ✗ | صلى الله عليه<br>19 ✓ |
| صلى الله عليه<br>20 ✓ | ضى الله عنه<br>21 ✗ | رضى الله عنها<br>22 ✗ | صلى الله عليه<br>23 ✓ |

| Query word | ١ ✓ | ٢ ✓ | ٣ ✓ |
|---|---|---|---|
| ٤ ✓ | ٥ ✓ | ٦ ✓ | ٧ ✓ |
| ٨ ✗ | ٩ ✗ | ١٠ ✓ | ١١ ✓ |
| ١٢ ✓ | ١٣ ✓ | ١٤ ✓ | ١٥ ✗ |
| ١٦ ✓ | ١٧ ✓ | ١٨ ✓ | ١٩ ✓ |
| ٢٠ ✓ | ٢١ ✗ | ٢٢ ✗ | ٢٣ ✗ |

3400

3500

METHOD FOR RETRIEVAL OF ARABIC HISTORICAL MANUSCRIPTS

BACKGROUND OF THE INVENTION

1. Field of the Invention

The present invention relates to content search and retrieval methods, and particularly to a method for retrieval of Arabic historical manuscripts that uses Latent Semantic Indexing.

2. Description of the Related Art

Typically, a Latent Semantic Indexing method (LSI) uses statistical techniques to model the way in which words are used in an overall collection of documents. In the resulting semantic space, a query can be similar to a document, even if they have no words in common. LSI is, thus, not dependent on any single word and might handle recognition errors robustly.

Large archives of historical Arabic manuscripts cannot be manually searched because of the difficulty of manual index construction, and also cannot be automatically searched, since they were stored in their original image forms. Optical character recognition (OCR) techniques are available, but due to the characteristics of the historical Arabic manuscripts and some content features, such as figures and drawings of manuscripts, OCR techniques may not yield satisfactory results due to feasibility issues. An alternative to OCR techniques involving a Contents-Based Image Retrieval (CBIR) system utilizing angular line feature extraction, concentric circle feature extraction, and similarity matching based on a variety of distance measures, as disclosed in S. A. Shahab et al., "Computer Aided Indexing of Historical Manuscripts", Proceedings of the International Conference on Computer Graphics, Imaging and Visualisation (July 2006), which is hereby incorporated by reference in its entirety. However, there remains room for improvement in such a system.

Thus, a method for retrieval of Arabic historical manuscripts solving the aforementioned problems is desired.

SUMMARY OF THE INVENTION

The method for retrieval of Arabic historical manuscripts is an electronic method of retrieving manuscripts that approaches the problem of manuscript indexing and retrieval by automatic indexing of Arabic historical manuscripts through word spotting, using "Text Image" similarity of keywords. The similarity is computed using Latent Semantic Indexing.

These and other features of the present invention will become readily apparent upon further review of the following specification and drawings.

BRIEF DESCRIPTION OF THE DRAWINGS

FIG. 2 is a diagram showing the component matrices of the SVD (singular value decomposition) of the content-based retrieval method of FIG. 1.

FIG. 15 is a diagram showing 8-connected foreground pixels according to the content-based retrieval method of FIG. 1.

FIG. 20 is a diagram showing experimental results of a query search for a particular Arabic word using circular polar grid features of a text symbol according to the content-based retrieval method of FIG. 1.

FIG. 21 is a diagram showing discarded words from the query of FIG. 20 using circular polar grid features for the text symbol according to the content-based retrieval method of FIG. 1.

FIG. 24 is a diagram showing experimental results of a third query search for a particular Arabic word using circular polar grid features of a text symbol according to the content-based retrieval method of FIG. 1.

FIG. 25 is a diagram showing discarded words from the query of FIG. 24 using circular polar grid features for the text symbol according to the content-based retrieval method of FIG. 1.

FIG. 26 is a diagram showing experimental results of a fourth query search for a particular Arabic word using circular polar grid features of a text symbol according to the content-based retrieval method of FIG. 1.

FIG. 27 is a diagram showing discarded words from the query of FIG. 26 using circular polar grid features for the text symbol according to the content-based retrieval method of FIG. 1.

FIG. 28A is a diagram showing Circular Polar grid features for a fifth query search for a particular Arabic word using circular polar grid features of a text symbol according to the content-based retrieval method of FIG. 1.

FIG. 28B is a diagram showing concentric circle features for the fifth query search of FIG. 28A.

FIG. 28C is a diagram showing angular line features for the fifth query search of FIG. 28A.

FIG. 28D is a diagram showing rectangular region features for the fifth query search of FIG. 28A.

Figures 29C, 29D:
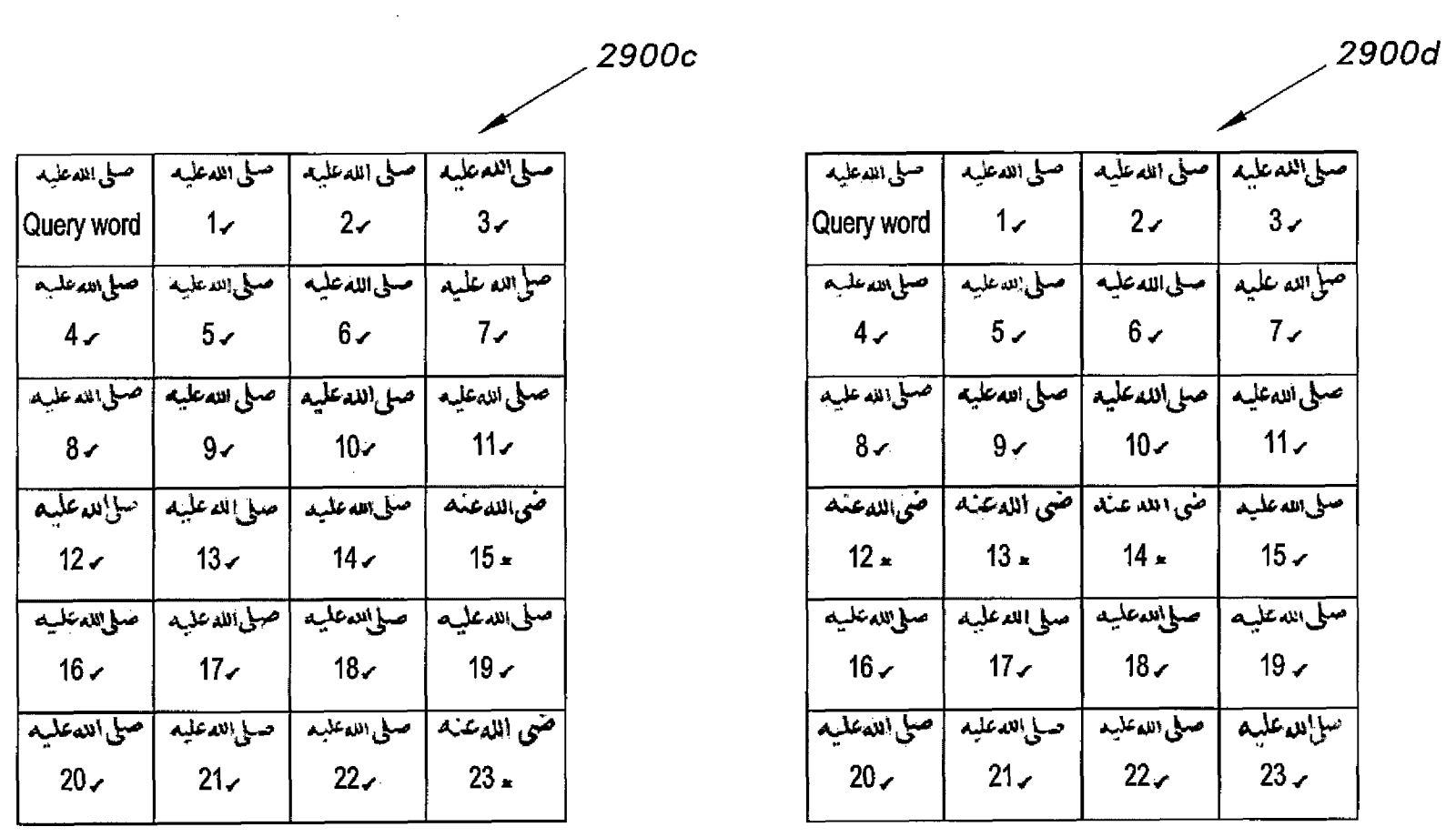

FIG. 29B is a diagram showing concentric circle features for the sixth query search of FIG. 29A.

FIG. 29C is a diagram showing angular line features for the sixth query search of FIG. 29A.

FIG. 29D is a diagram showing rectangular region features for the sixth query search of FIG. 29A.

Similar reference characters denote corresponding features consistently throughout the attached drawings.

DETAILED DESCRIPTION OF THE PREFERRED EMBODIMENTS

Figure 1:
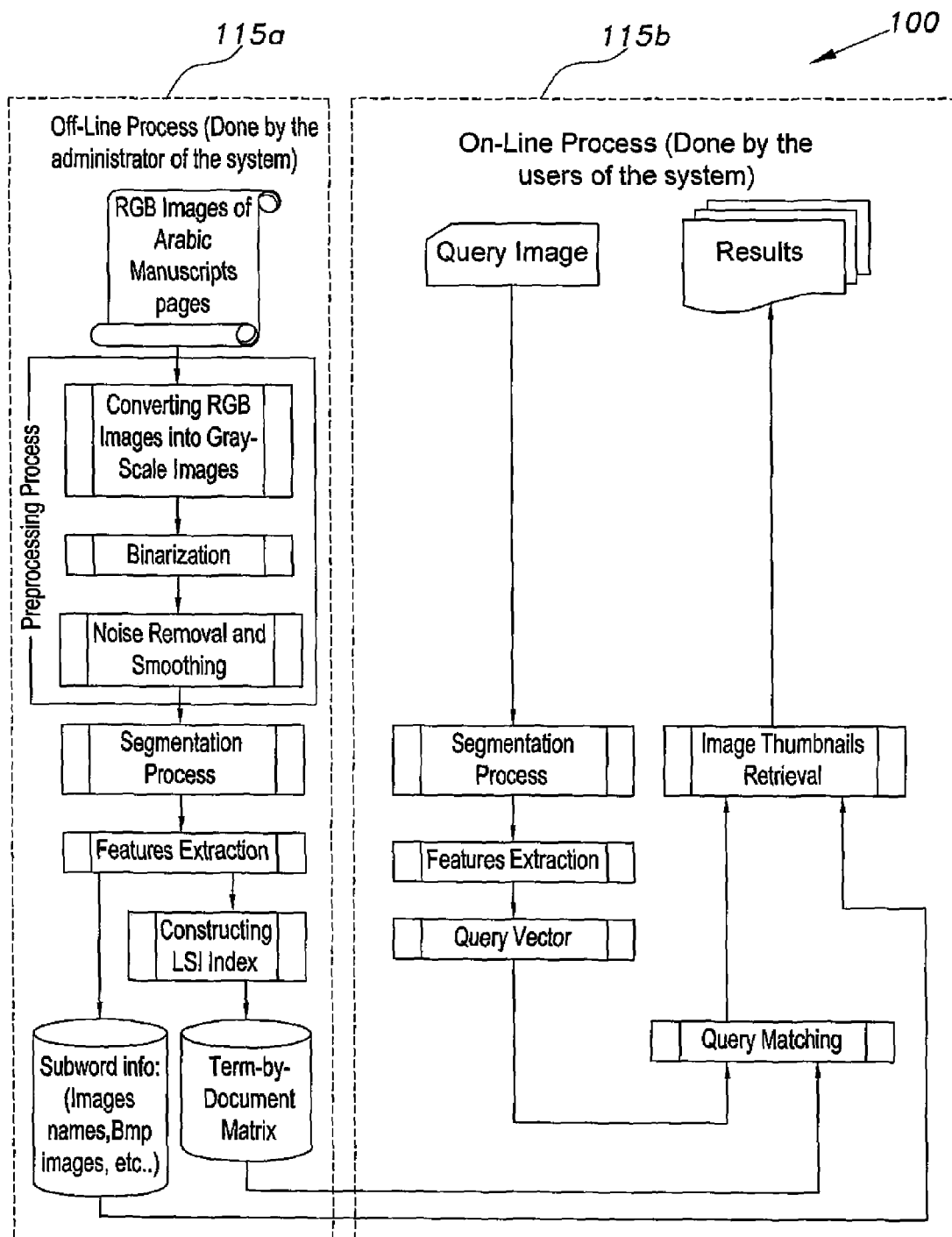
FIG. 1 is a flowchart of a content-based retrieval method used in a method for retrieval of Arabic historical manuscripts according to the present invention.

As shown in FIG. 1, the method for retrieval of Arabic historical manuscripts using Latent Semantic Indexing 100 includes an off-line process 115a and an on-line process 115b. Latent Semantic Indexing (LSI) is used as a vector space, and the map from term space to concept space is obtained via singular value decomposition (SVD) by retaining the largest singular values. The LSI method is a main process, which is used as a mathematical model for word and subword recognition. The present method performs LSI on documents and terms that are handwritten images. The indexing method 100 approaches the problem of manuscript indexing and retrieval by automatic indexing of Arabic historical manuscripts through word spotting, using "Text Image" similarity of keywords. The similarity is computed using Latent Semantic Indexing (LSI). The method involves a manuscript's pages preprocessing step, a segmentation step, and a feature extraction step. Feature extraction utilizes a novel circular polar grid feature set. Once the salient features have been extracted, indexing of historical Arabic manuscripts using LSI is performed in support of content-based image retrieval (CBIR). CBIR is preferred over OCR because character-by-character word recognition usually fails in this instance due to faded ink, stained and lacerated paper, perforated paper and scribbles. CBIR uses low-level features (e.g. color, shape and texture) to index and retrieve images from databases without regard to accompanying textual information.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the invention. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The main reason for employing Latent Semantic Indexing (LSI) is its ability to carry out similarity matches using thresholds that are largely independent from the underlying features used. This is important in Arabic manuscripts due to the complexity of the script. For example, the Arabic language has 28 letters, and more than half of them can assume four different shapes depending on their position (i.e. initial, medial, final, or isolated) within the word. For example, the letter "seen" (س) (the name of the letter does not transliterate literally into English; it is translated phonetically, and is also known as siin and sīn takes the following forms: (ســ) at the beginning of the word, (ـســ) in the middle of the word, (ـس) at the end of the word and (س) as an isolated letter. Moreover, a word may consist of one or more subwords. This adds another difficulty to the recognition process. For example, the word (جامعة) which means university, consists of two parts (جا) and (معة). Some letters have the same bodies with different dot positions, as in "ba" (ب) "ta" (ت) and "tha" (ث). Combinations of some letters may form a new shape, which is a vertical stacking of two or more characters. For example, the word (لا) consists of the letter (ل) and the letter (ا), which are very difficult to separate. Writers prolong letters for decorative reasons or for justifying text. These prolongings can cause vertical overlaps with neighboring letters. Some of the resulting difficulties are: two different words have been written in such a way, i.e., by prolonging letters, as to be impossible to segment; overlapping of two letters; combinations of some characters form new shapes that are vertical stockings of two letters; different letters with the same shapes, but the use of dots in relation to the letters distinguish them; two different shapes that depend on the position of the letter within a word; and last, a word consisting of three subwords.

In Arabic literature and books, including Arabic manuscripts, there are distinct words and phrases called keywords, which can be used to make a specialized search on a topic or a specific paragraph. What distinguishes these keywords is that they are frequently repeated in the pages of a book, and a particular topic may be searched or inferred through these keywords. For example, in the books of prophetic tradition (الحديث الشريف), a tradition text may be searched using a few words, including the names of the narrators of the tradition, such as Abu Huraira (أبو هريرة), or the names of the collectors of these traditions, such as Al-Bukhaari (البخاري) and Muslim (مسلم). Moreover, most of the texts of the traditions begin with the words: The Messenger of Allah peace be upon him, said (قال رسول الله صلى الله عليه وسلم), and ends with the name of the narrator. Hence, the beginnings of the tradition texts and their endings can be searched. In the field of Arabic literature and poetry, specific verses by Al-Mutannabi (المتنبي) (an Arab poet) can be searched just by searching the word (المتنبي). Moreover, praise (المدح), satire (الهجاء), or pride (الفخر) poetry can be searched using expressions related to them. As for Arabic Grammar books, there are words, such as verb (فعل), subject (فاعل), noun (اسم), and adjective (صفة), that show the function and the structure of the Arabic sentence. As for the books of jurisprudence and legal transactions, we find such words as duties (واجبات) provisions (الشروط), hated) (مكروه), and desirable (مستحب), which can be used to search terms and provisions of a particular topic. For example, some terms and conditions of prayer may be searched by searching the word prayer (الصلاة), or to be more specific, by searching for such words as provisions of prayer (شروط الصلاة) On the other hand, ablution subject and its terms can be searched through the expression purity chapter (أحكام الطهارة).

The Latent Semantic Indexing (LSI) model is used to exploit geometric relationships between document and term vectors in order to explain both similarities and differences. LSI attempts to project very high dimensional document and query vectors into a low dimensional space. This uses a singular value decomposition (SVD) of the term-by-document matrix.

The singular value decomposition (SVD) of any matrix $A^{m \times n}$ of rank $r \leq q \min(m,n)$, denoted by SVD(A), is defined as:

$$A = U \Sigma V^T \quad (1)$$

where $U^{m \times m}$ and $V^{n \times n}$ are orthogonal matrices, and $\Sigma^{m \times n}$ is a diagonal matrix.

The first r columns of U and V are called the left and right singular vectors, respectively. The elements $\sigma_i$ of $\Sigma$ are the nonnegative square roots of the n eigenvalues of $AA^T$ or $VA^T$.

Figure 2:
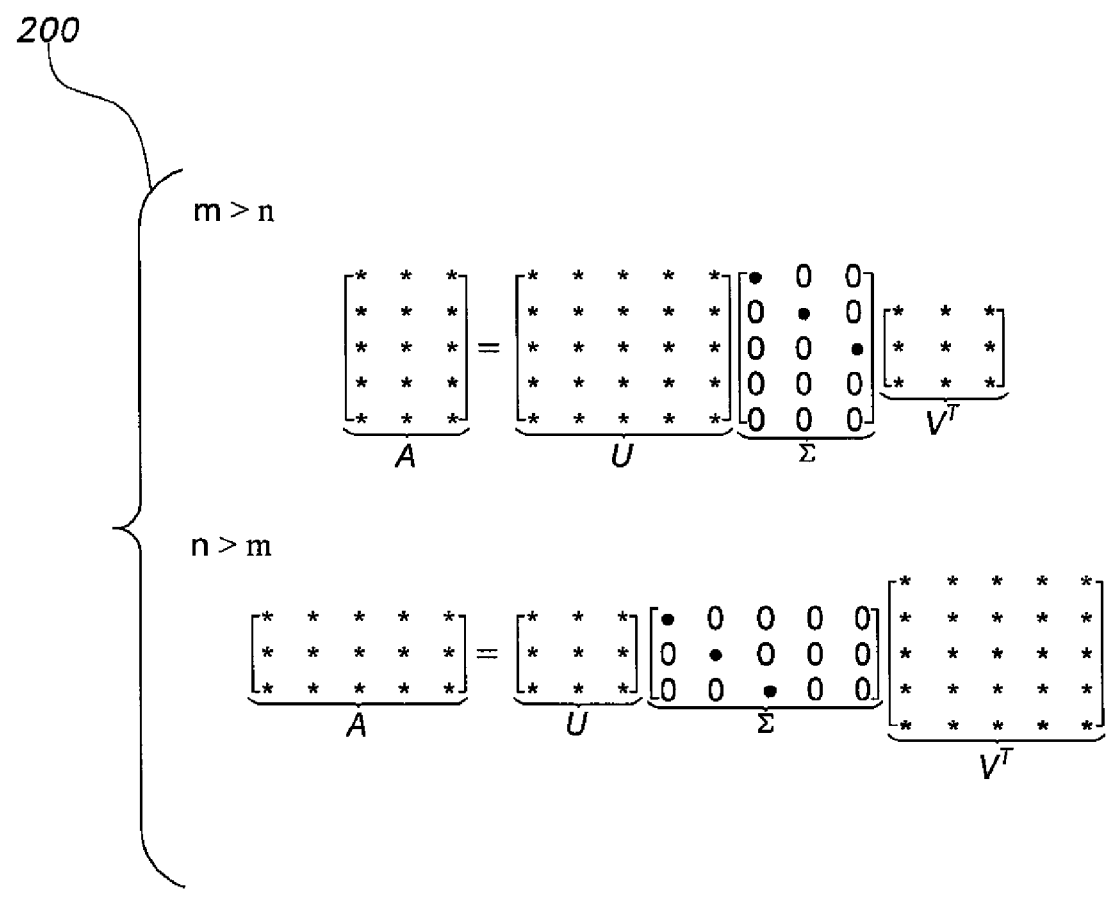

In other words, U is the m×m orthogonal matrix whose columns define the left singular vectors of A, V is the n×n orthogonal matrix whose columns define the right singular vectors of A, and $\Sigma$ is the m×n diagonal matrix containing the singular values $\sigma_1 \geq \sigma_2 \geq \ldots \geq \sigma_{min(m,n)}$ of A in order along its diagonal. The SVD component matrices 200 are illustrated in FIG. 2. The following theorem is used to construct an approximation of A and estimate its quality. Let the SVD of A be given by the definition characterized by equation (1) with $\sigma_1 > \sigma_2 > \ldots > \sigma_{r+1} = \ldots \sigma_q = 0$, and define the truncated SVD approximation $A_k$ of A as:

$$A_k = \sum_{i=1}^{k} u_i \cdot \sigma_i \cdot v_i^T = U_k \sum_k V_k^T \quad (2)$$

then $$\min_{rank(B) = k} \|A - B\|_F^2 = \|A - A_k\| = \sum_{i=k+1}^{q} \sigma_i^2 \quad (3)$$

Thus, the best rank k approximation of A with respect to the Frobenius norm is as defined by equation (2).

In text retrieval (TR), a document collection comprised of n documents that are indexed by m terms can be represented as an m×n term-by-document matrix A, where n columns represent the n documents and m rows represent the m terms. Thus, the matrix element is a weighted frequency at which term i occurs in document j. In the present method, all subword images and their feature values are used as a document collection. Thus, n columns represent the images, and m rows represent the feature values.

Figures 3A, 3B:
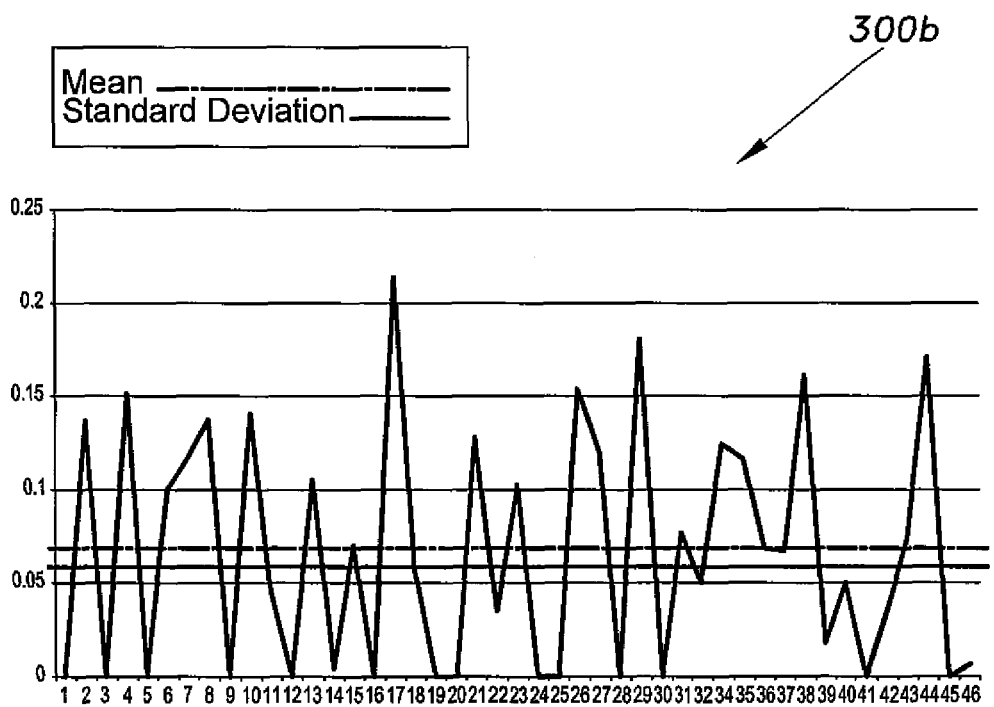
FIG. 3A is a diagram showing the term-by-document matrix of the content-based retrieval method of FIG. 1.
FIG. 3B is a plot showing normalized values of rectangular region features used in the content-based retrieval method of FIG. 1.

With respect to LSI in image retrieval, two challenges have emerged: (1) what are the documents, and (2) what are the terms. In the instant method, the documents and the terms that are used in TR are replaced by subword images and feature values, respectively. Thus, the columns of the term-by-document matrix will represent subword images and the rows represent feature values. FIG. 3A shows how an 8×3 term-by-document matrix 300a is constructed from a small collection of subwords of the image of the word "prophet" (رسول). Angular line features and subword images were chosen as terms and columns, respectively, for indexing purposes. Another problem arose related to the feature value itself. In applying LSI to TR, the occurrence of the terms is easy to imagine and compute. In contrast, the notion of occurrence is even harder to imagine for image features that have numeric values, i.e., counter of black pixels within an area. To address this problem, the concept of feature occurrences is applied. Different combinations of feature sets are tested in order to determine the suitable number of features that make LSI perform with satisfactory results.

Feature normalization techniques aim at normalized extracted features in such a way that the normalized features are better suited for classification. For example, normalized features are suitable for a word written in different sizes. A simple technique used to carry out the features normalization includes counting the number of black pixels within a given area and dividing the area black pixel count by the count of all black pixels within the word image. We apply these steps for all regions within a given word image. Table 1 depicts these normalized features.

TABLE 1

Normalized Features

| Feature types | f1 | f2 | f3 | f4 |
|---|---|---|---|---|
| Features Counter | 237 | 902 | 795 | 556 |
| Normalized Features | 0.0949 | 0.3609 | 0.3179 | 0.2234 |

The major problem of applying LSI to image retrieval is that terms must be replaced by image features. In image feature values, there is no existence of occurrence, thus, we have to convert these feature values into feature occurrences. In order to do that, we apply the following algorithm, shown in Table 2.

TABLE 2

Feature Value Conversion Algorithm

| STEP | ACTION |
|---|---|
| 1 | Pick a comprehensive training set of a document for each feature. |
| 2 | Compute the mean $\mu_f$ and the standard deviation $\sigma_f$ of the features f's value across the training set. |
| 3 | For each image in the collection define the "occurrence count" $O_{fj}$ of feature f as: |

$$O_{fj} = \begin{cases} \left\lceil \dfrac{val_{fj} - \mu_f}{\sigma_f} \right\rceil & \text{if } val_{fj} > \mu_f \\ 0 & \text{otherwise} \end{cases} \quad (4)$$

Figure 3C:
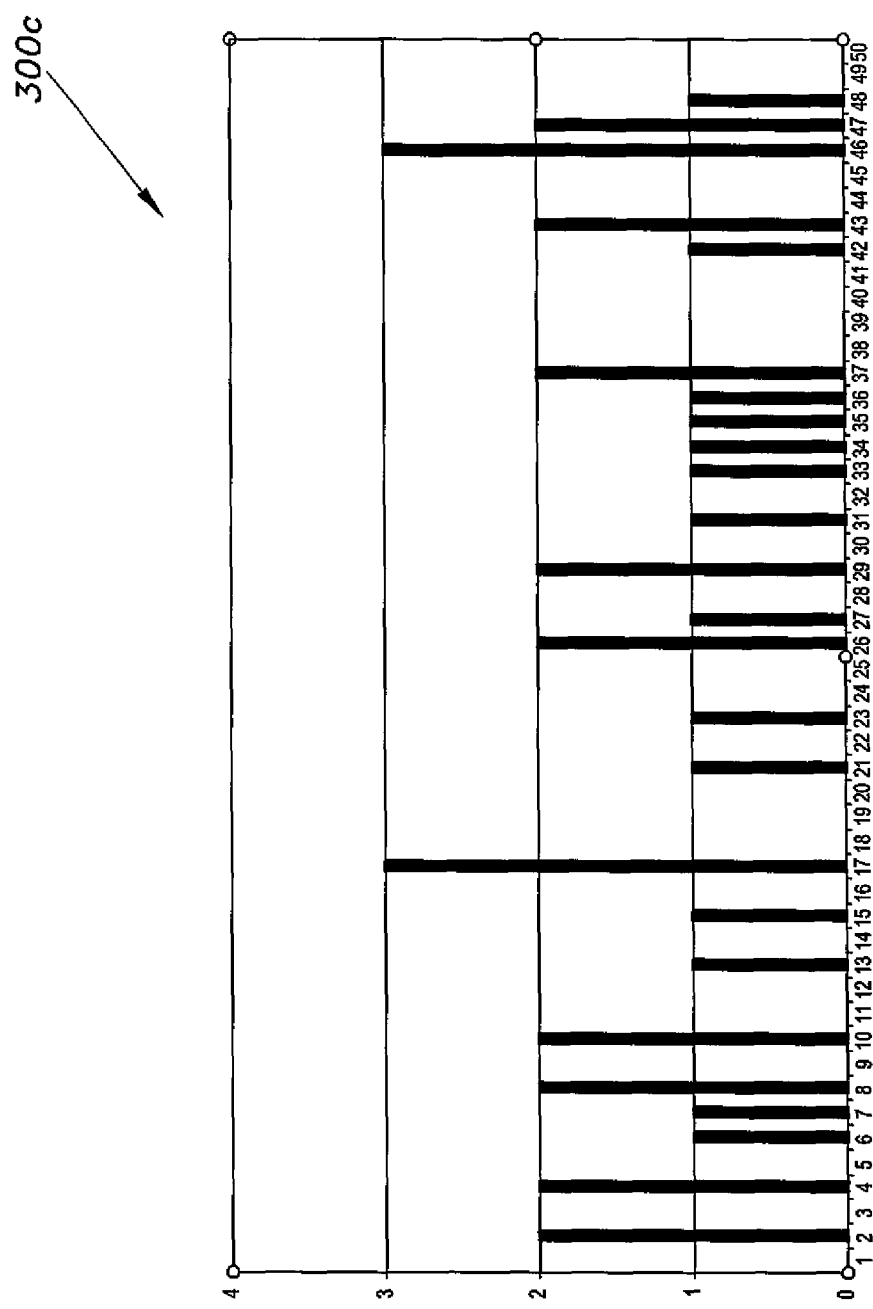
FIG. 3C is a bar graph showing the results of applying the values in FIG. 3B to rectangular region features in the content-based retrieval method of FIG. 1.

In Table 2, $val_{fj}$ is the value, of the feature f in image j. Table 3 includes these feature occurrence values of the rectangular region features for a given word. Plot 300b of FIG. 3B and bar graph 300c of FIG. 3C illustrate this idea.

TABLE 3

Feature Occurrences of the Normalized Rectangular Region Features

| f1 | f2 | f3 | f4 | f5 | f6 | f7 | f8 | f9 |
|---|---|---|---|---|---|---|---|---|
| 0 | 0 | 2 | 0 | 2 | 1 | 2 | 0 | 0 |

The goal of term weighting is to condition the data in order to improve retrieval performance. Conditioning data will describe the relative frequency (i.e., the importance) of a term i in a document j, which is called local weighting $l_{ij}$, and within the entire collection of documents, which is called global weighting $g_i$. Recall that a collection of n documents indexed by m terms can be represented as term-by-document matrix $A=[a_{is}]$, where each element is defined as:

$$a_{ij} = l_{ij} g_i \quad (5)$$

There are many local functions and global functions that can be used to compute term weighting. Many empirical studies report that Log Entropy weighting works well with many data sets. Thus, each entry $a_{ij}$ of A is computed as:

$$a_{ij} = g_i \log(f_{ij}+1) \quad (6)$$

where $f_{ij}$ is the frequency that term i appears in document j, while $g_i$ can be computed as:

$$g_i = 1 + \sum_j \frac{p_{ij} \log(p_{ij})}{\log n} \quad (7)$$

where $$p_{ij} = \frac{f_{ij}}{\sum_j f_{ij}} \quad (8)$$

Query matching in the vector space model can be viewed as a search in the column space of the matrix A or can be formulated using the component matrices of the SVD. Suppose we have a query vector q and n columns of the reduced-rank matrix $A_k$. The trigonometric function cos θ can be used as a distance measure to retrieve a relevant document. Computations of this measure are as follows:

$$\cos\theta_j = \frac{(A_k e_j)^T q}{\|A_k e_j\|_2 \|q\|_2} = \frac{\left(U_k \sum_k V_k^T e_j\right)^T q}{\|U_k \sum_k V_k^T e_j\|_2 \|q\|_2} \quad (9)$$

for j=1, 2, . . . , n.

For the scaled document vector $s_j = \Sigma_k V_k^T e_j$, the formula in equation (9) can be simplified to:

$$\cos\theta_j = \frac{s_j^T (U_k^T q)}{\|s_j\|_2 \|q\|_2}, \text{ for } j = 1, 2, \ldots, n. \quad (10)$$

In the present method, a user can specify a query word, and the system will search and retrieve occurrences of the query word found in the database. All of the retrieved words will be presented to the user to select the relevant words. Moreover, the searching process will have several options (e.g. controlling threshold values, selecting feature types, and selecting the feature set). The present method utilizes five main modules, which include an image pre-processing module, an image segmentation module, a feature extraction module, an LSI index construction module, and a query matching module. Each one of these modules includes several tasks, detailed in the flowchart 100 shown in FIG. 1.

In the preprocessing stage 115a, necessary operations carried out on manuscript images in order to represent them in a way that can be measured for enhancing the efficiency of the developed system include binarization, noise removal and smoothing. These processes increase the efficiency of later processes, such as segmentation and retrieval. Since processes for converting color images to binary (or black and white) images and for noise removal and smoothing are conventional, this step may be viewed as optional, so that the method operates on manuscript images that have already been converted to black and white images and processed for noise removal and smoothing.

Figure 4:
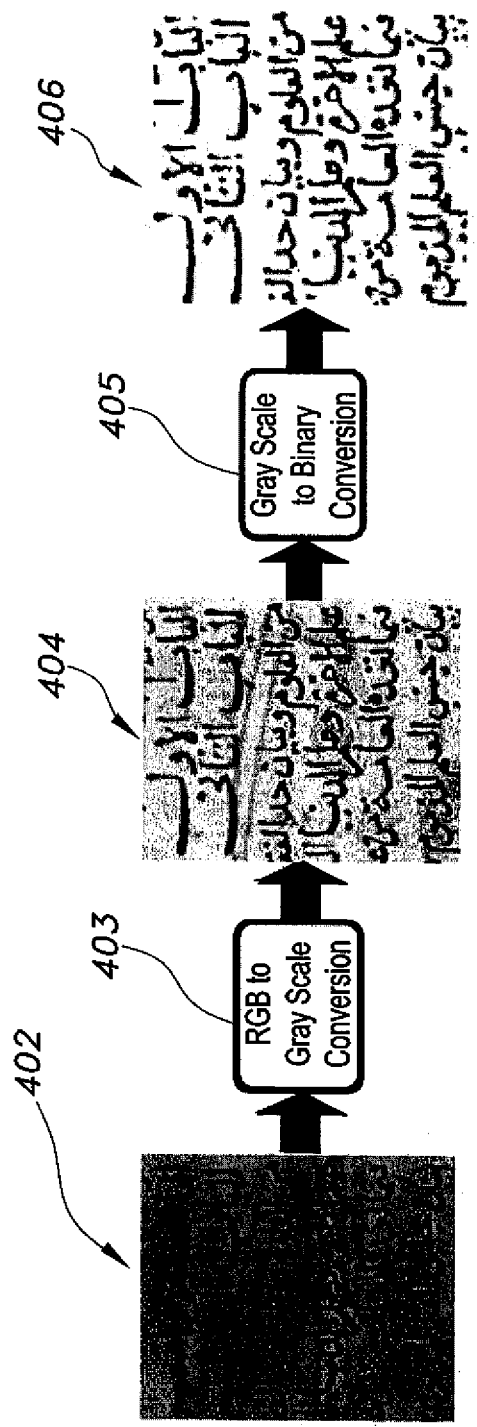
FIG. 4 is a diagram showing the steps in converting RGB (color) images to binary (black and white) representations of the images in the content-based retrieval method of FIG. 1.

Most features used in the developed system depend entirely on the count of black pixels within an area. Thus, binary images (i.e., black and white images) as a source of features are a suitable choice in the present method. Many Arabic manuscripts that were stored as images are colored images. Converting these colored images into binary images, i.e., binarization, is done by converting RGB color space to a gray-scale image, and then converting a gray-scale image to a binary image. As shown in FIG. 4, an RGB image 402 undergoes RGB-to-grayscale conversion 403, producing a grayscale image 404, which undergoes grayscale-to-binary conversion 405 to produce a binary image 406. The aim of these conversions is to simplify the amount of information in the colored images. Although a binary image contains less information than a colored image, the majority of important, feature-related information is maintained, such as regions, black and white pixels, connected parts, and so on.

Figure 5:
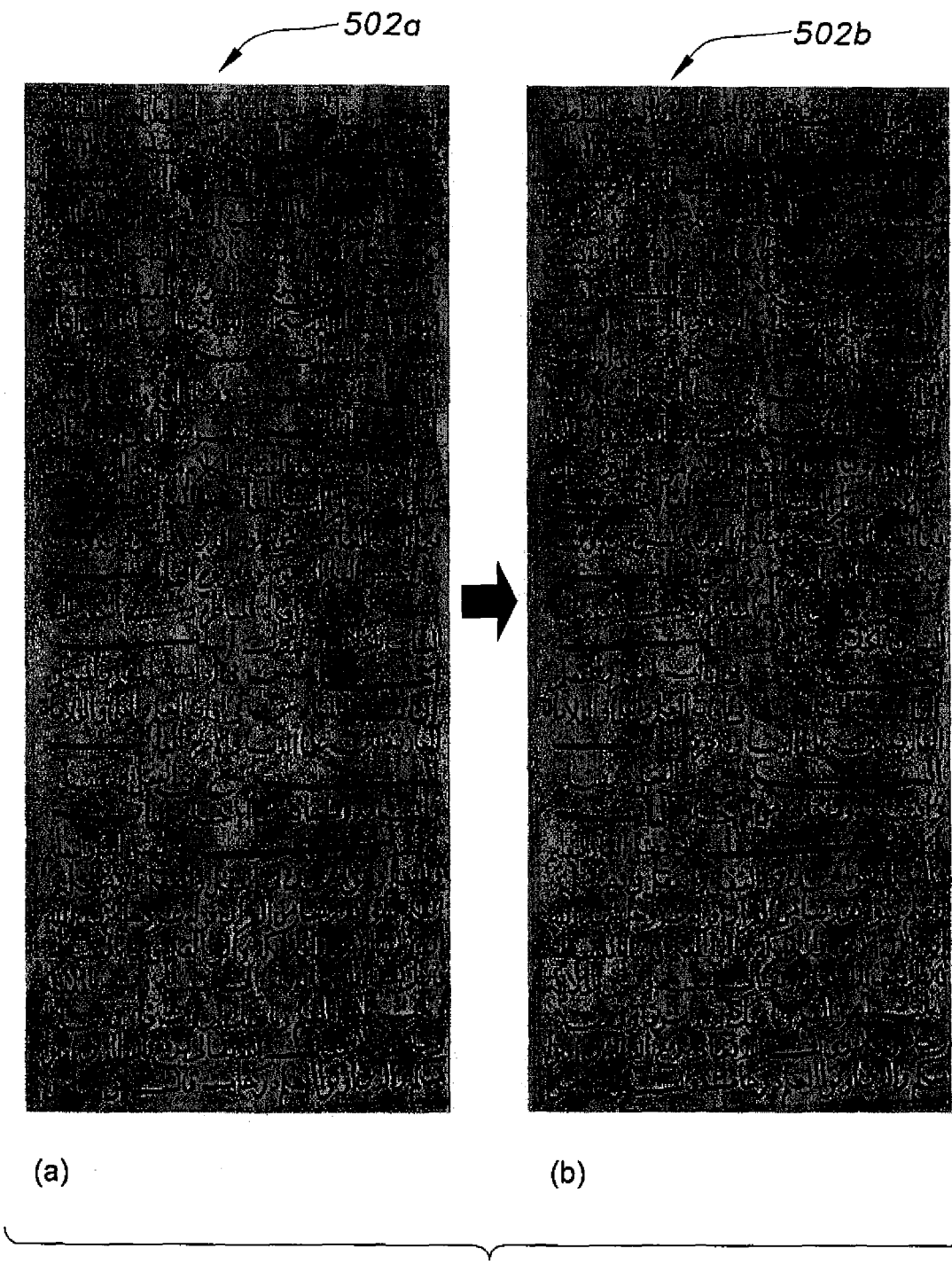
FIG. 5 is a diagram showing the RGB to grayscale conversion step in the content-based retrieval method of FIG. 1.

An image can be converted from RGB color space to a grayscale image using a simple transformation by eliminating the hue and saturation information related to a pixel, while retaining the luminance of a pixel. This conversion is implemented by using the following transformation:

$$I_{grayscale}(n, m) = \alpha I_{color}(n, m, R) + \beta I_{color}(n, m, G) + \gamma I_{color}(n, m, B) \quad (11)$$

where $I_{grayscale}$ is a gray-scale image, $I_{color}$ is a RGB color image, (n,m) are the coordinates of an individual pixel within a grayscale image or a color image. The symbols R, G, and B are color channels for red, green and blue colors respectively. In other words, the gray-scale image is a weighted sum of the red, green and blue color channels. While $\alpha=0.2989$, $\beta=0.5870$ and $\gamma=0.1140$ represent the weighting coefficients, the intensity level of the image pixels ranges from 0 to 255, where 0 value represents a black pixel and 255 represents a white pixel. FIG. 5 shows a gold RGB image 502a, and the conversion resulting in a gray-scale image 502b.

The binarization process replaces all pixels in the input image, i.e., the gray-scale image, with luminance greater than an intensity threshold with the value 1 (white pixels) and replaces all other pixels with the value 0 (black pixel). The following equation can be applied in order to create a binary image from a gray-scale image.

$$I_{binary}(n, m) = \begin{cases} 1 & \text{if } I_{grayscale}(n, m) > T \\ 0 & \text{otherwise} \end{cases} \quad (12)$$

where T is the intensity threshold, $I_{grayscale}$ is a grayscale image, $I_{binary}$ is a binary image, and (n,m) are the coordinates of an individual pixel within a gray-scale image and a binary image.

Figure 6:
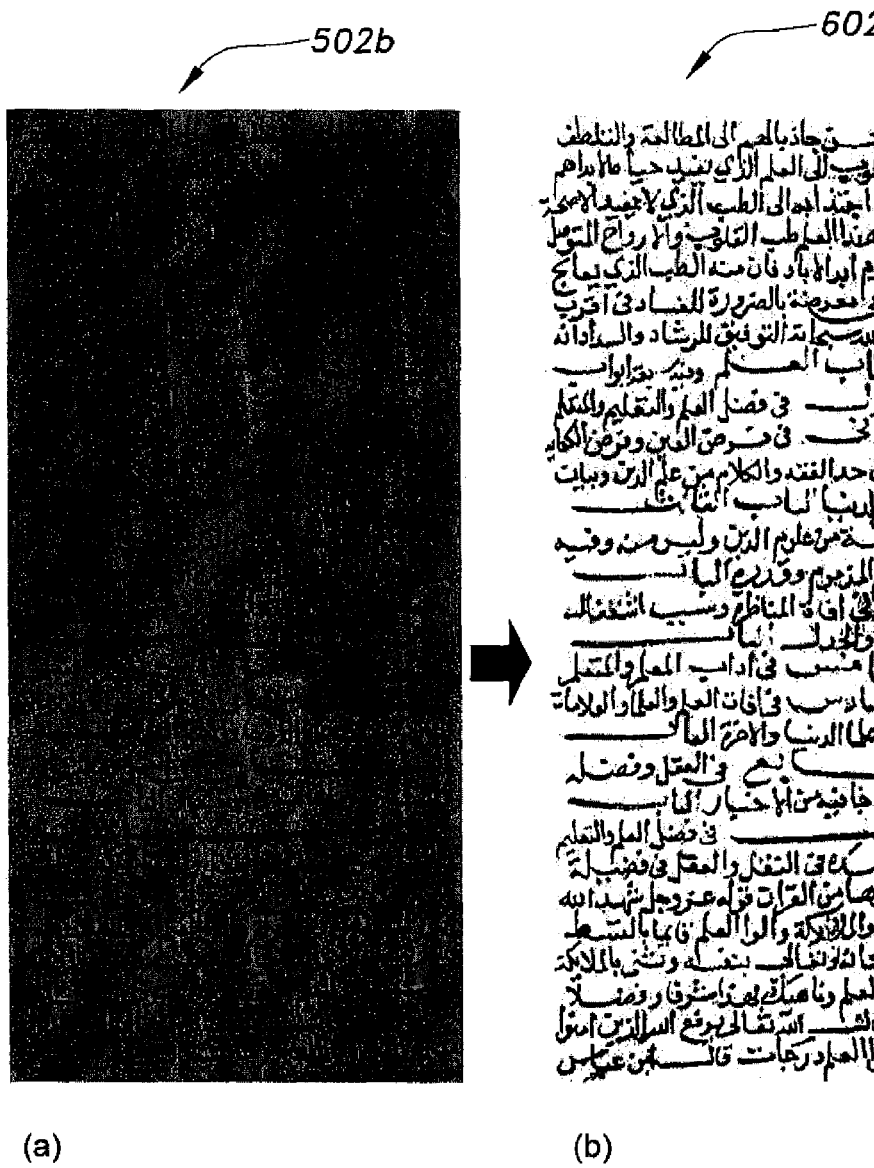
FIG. 6 is a diagram showing the grayscale to binary conversion step in the content-based retrieval method of FIG. 1.

FIG. 6 depicts a grayscale image 502b and its subsequent conversion to a binary image 602. The intensity threshold of the grayscale image must be computed. This threshold is computed automatically, which is suitable for the present method because many processing tasks require full automation. The common method to compute it automatically is from a gray level histogram, as is known by artisans having ordinary skill. This method selects the threshold that results in the tightest clustering of the two groups represented by the foreground and background pixels.

Figures 7, 8:
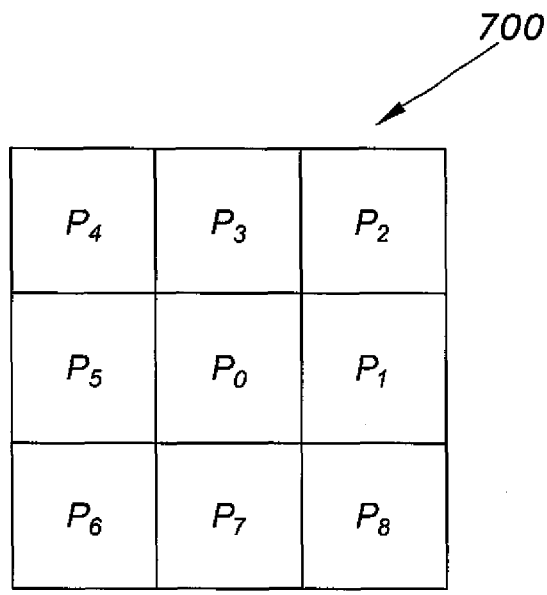
FIG. 7 is a diagram of a grid showing the current pixel and nearest neighbors used in the content-based retrieval method of FIG. 1.
FIG. 8 is a diagram showing the results of the smoothing and noise removal steps in the content-based retrieval method of FIG. 1.

The smoothing module is used for blurring and noise reduction. These two operations are used in removal of small objects that are not part of the text or are irrelevant areas of images. In order to remove these irrelevant pixels and fill the gap between connected components, a commonly known smoothing algorithm based on a statistical decision criterion is employed. Given a binary image of an Arabic subword, the algorithm modifies each pixel according to its initial value and those of its neighbors. The rules are stated as follows:

If $P_0=0$, then:

$$\acute{P}_0 = \begin{cases} 0 & \text{if } \sum_{i=1}^{8} P_i > T \\ 1 & \text{otherwise} \end{cases} \quad (13)$$

else $$\acute{P}_0 = \begin{cases} 1 & \text{if } p_i + p_{i+1} = 2 \text{ for at least one } i = 1, 2, \ldots, 8 \\ 0 & \text{otherwise} \end{cases} \quad (14)$$

where $P_0$ is the current pixel value, $\acute{P}_0$ the new pixel value, and T is the threshold. According to the prior art, an experimentally determined threshold of 5 yields acceptable results. The current pixel and its neighbors 700 are shown in FIG. 7, while FIG. 8 shows a noisy image 800a and the smoothed and noise removed image 800b.

The objective of the segmentation process is to segment all of the manuscript pages, i.e. images, into connected components (i.e. words/subwords). In order to achieve this objective, a first module segments the whole text within a page into lines, and a second module segments the lines of the first module into connected components.

To segment a manuscript image into line images, we depend on a well-defined method that enables us to detect a baseline of the Arabic scripts. Arabic baseline is very important in our developed system because it is used to estimate the location of peaks and to indicate the number of lines within a page in order to segment the whole page to lines. There are several methods, such as horizontal projection, word skeleton, and word counter representation, used in detecting baseline. The present method implements a process that is based on horizontal projection.

Figure 9:
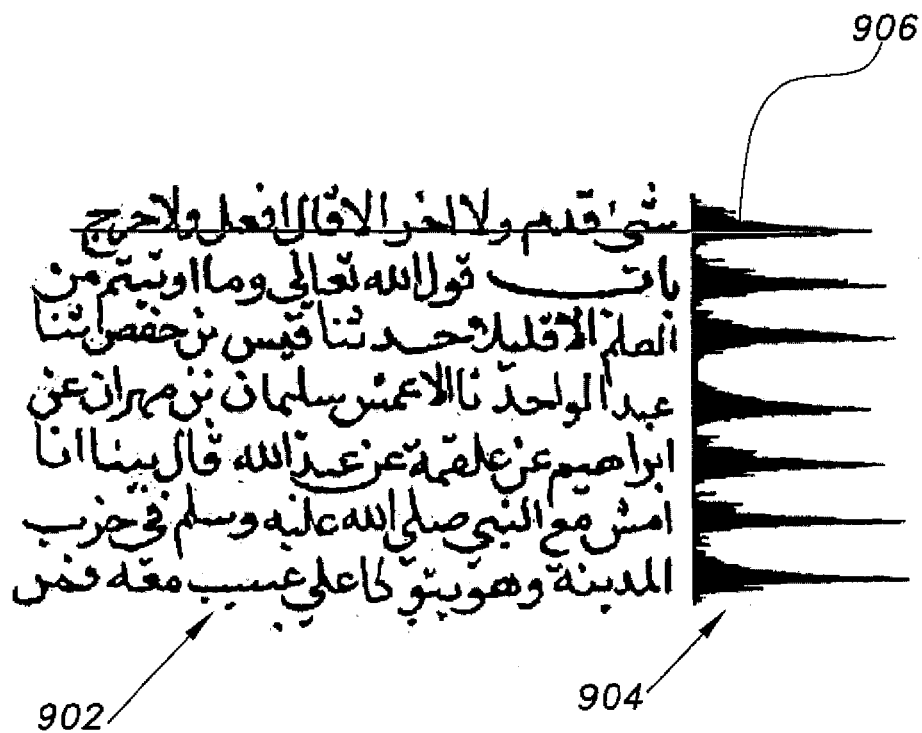
FIG. 9 is a diagram showing the baseline detection of manuscript rows in the content-based retrieval method of FIG. 1.

The horizontal projection method to detect the Arabic baseline works by reducing the two dimensional (2D) of data to one dimension (1D) based on the pixels of the subword image, and the longest link that will implement in a straight line will be the Arabic text baseline. FIG. 9 visualizes the horizontal projection method for detecting the Arabic baseline. An Arabic manuscript binary image 902 is processed to provide a horizontal projection 904 of the image 90, which includes the first line's baseline 906. We compute the horizontal projection profile by using the following equation:

$$P_i = \Sigma Img(i,j) \quad (15)$$

where P(i,j) is the horizontal projection of the image for row i, and Img(i,j) is the pixel value at (i,j).

In the Segmentation of Line Images to Subword Images procedure, a line image is segmented to connected-component images by applying a known connected component algorithm. Additionally, each subword is tagged with specific information, such as page number and line number for storage and retrieval purposes.

Figure 10:
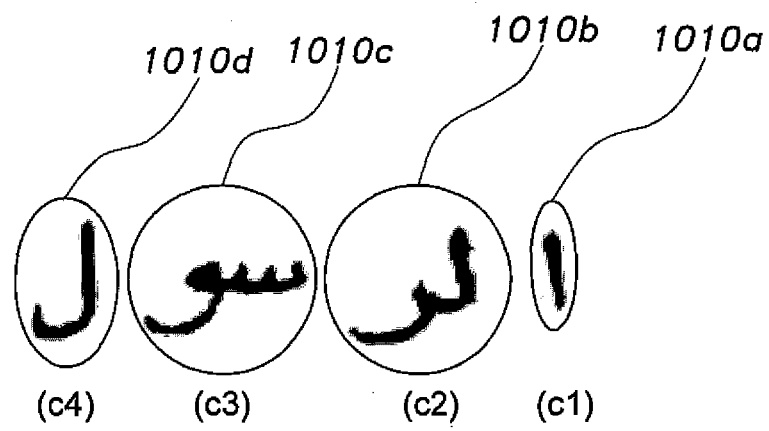
FIG. 10 is a diagram showing the 4-connected components of an exemplary word processed by the content-based retrieval method of FIG. 1.
Figure 11:
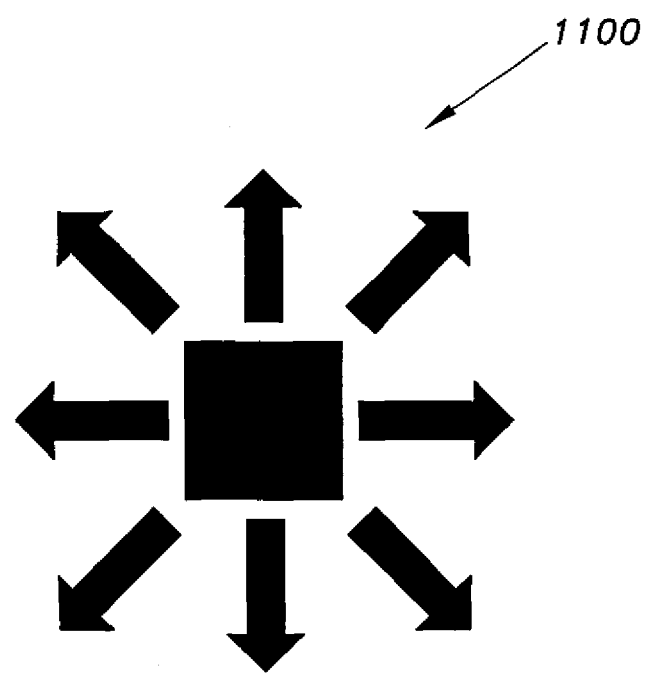
FIG. 11 is a diagram showing an exemplary 8-connected pixel used by the content-based retrieval method of FIG. 1.

Concepts of connected component labeling are used to detect connected regions, i.e., connected parts of the subword images within a segmented line. A connected region consists of any group of connected pixels. For example, as shown in FIG. 10, the Arabic word (الرسول), which means prophet, has four connected parts: (c1) 1010*a*, (c2) 1010*b*, (c3) 1010*c*, and (c4) 1010*d*. The 4-connection and 8-connection are commonly used definitions of connection between pixels. Here, we are interested in 8-connection, which is defined as: if a given foreground pixel has at least one neighboring foreground pixel to the north, south, east, west, north-east, north-west, south-east or south-west of itself, then this neighboring foreground pixel can be considered as part of the same object. These simple concepts are illustrated in pixel drawing 1100 of FIG. 11.

Figure 12:
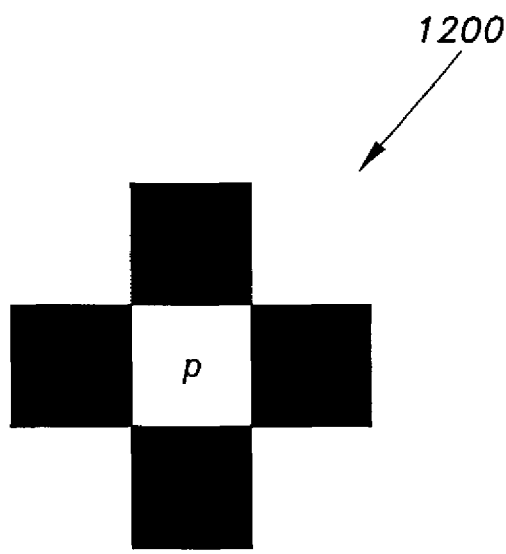
FIG. 12 is a diagram showing an exemplary pixel and 4 neighbors according to the content-based retrieval method of FIG. 1.
Figure 13:
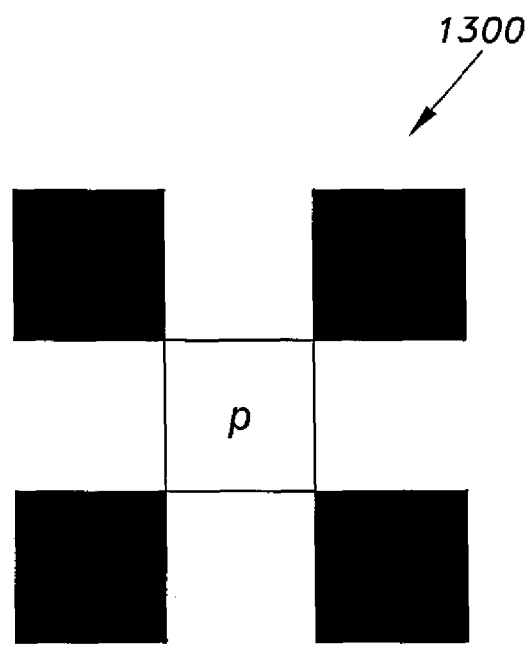
FIG. 13 is a diagram showing an exemplary pixel and diagonal neighbors according to the content-based retrieval method of FIG. 1.
Figure 14:
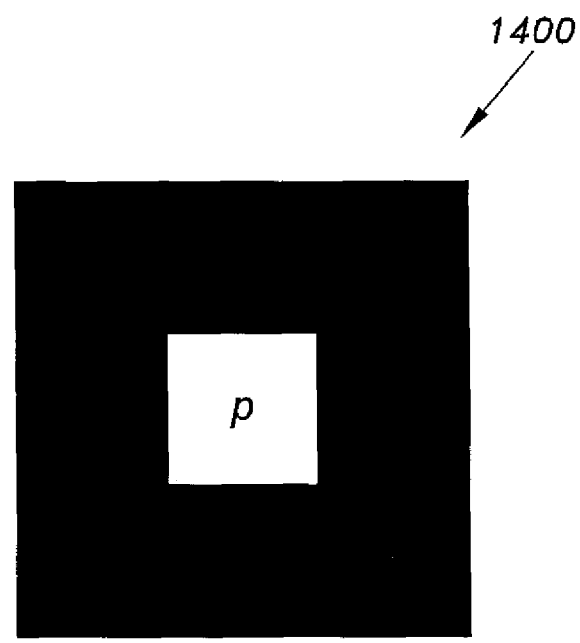
FIG. 14 is a diagram showing an exemplary pixel and 8-connected neighbors according to the content-based retrieval method of FIG. 1.

Prior art researchers have defined mathematical representation of the concepts of connection components as follows:

A pixel p at coordinates (x,y) has two horizontal and two vertical neighbors, whose coordinates are (x+1, y), (x−1, y), (x,y+1) and (x,y−1). This set of 4-neighbors 1200 of p, denoted $N_4(p)$, is shown in FIG. 12. The four diagonal neighbors of p have coordinates (x+1, y+1) (x+1, y−1), (x−1, y+1) and (x−1, y−1). FIG. 13 shows these neighbors 1300, which are denoted $N_D(p)$. The union 1400 of $N_4(p)$ and $N_D(p)$, shown in FIG. 14, results in the 8-neighbors of p, denoted $N_8(p)$. Two pixels p and q are said to be 8-adjacent if $q \in N_8(p)$. FIG. 15 shows a small region 1500 that is extracted from a binary line image.

With respect to feature extraction, the objective is to extract the essential attributes that describe each word/subword resulting from the segmentation process. Generally, feature extraction is considered as a difficult problem in pattern recognition systems. This difficulty lies in what are the proper features to be extracted. The present method uses four sets of low-level features, including: (1) Concentric circle features, (2) angular line features, (3) rectangular region features, and (4) circular polar grid features. These features are represented as numerical values in order to construct LSI indexing and to carry out efficient searching and retrieval.

Four concentric circle features are computed by counting the number of black pixels contained between concentric circles centered at the centroid with radius 1×r, 2×r, . . . , (n−1)×r, n×r, where n is the number of concentric circles. Then, the values are normalized by dividing the count of black pixels within each region by the count of black pixels within the subword image. In practice, these features are computed using the following steps.

The first step computes the centroid of the image according to the image centroid computation algorithm outlined in Table 4.

TABLE 4

Image Centroid Computation (Algorithm 1)
ACTION

Input: Image
    Output: Centroid of an image ( )
Read Image I
for r←0 to I.allRows−1
 for c←0 to I.allCols−1
  if I(r,c)=BlackPixel
   xCtr.row ← xctr.row + (I.allRows−1) − r
   yCtr.col ← yctr.col + c
   area ← area + 1

TABLE 4-continued

Image Centroid Computation (Algorithm 1)
ACTION end if
 end for
end for
xCtr← xCtr / area
yCtr← yCtr / area
Ctr(xCtr,yCtr)

Second, the distance between the centroid and the original pixel Org(0,0) is computed using the following equation:

$$Dis = \sqrt{xCtr^2 + yCtr^2} \qquad (16)$$

Third, the radius of the concentric circles is calculated using the equation:

$$r_i = \frac{Dis}{n} \times i \qquad (17)$$

where i=1, 2, . . . , n and n is the number of concentric circles.

Fourth, the black pixel count computation within concentric circles algorithm is performed as outlined in Table 5.

TABLE 5

Concentric Circles Black Pixel Count Computation (Algorithm 2)
ACTION

Input: Ctr(xCtr,yCtr), r[1: n], n
 Output: Count of black pixels, count[1:4], within concentric circles
count[1:4] ← 0
for each pixel p(x,y) in image I
 if $\sqrt{(x - xCtr)^2 + (y - yCtr)^2} < r_1$
  count(1) ← count(1) + 1
 end if
 for i←1 to n−1
  if $r_i \leq \sqrt{(x - xCtr)^2 + (y - yCtr)^2} < r_{i+1}$
   count(i+1) ← count(i+1) + 1
  end if
 end for
end for Fifth, the normalized values of the concentric circle features are computed using the following equation:

$$NorConC = \frac{count_i}{\sum_i^n count_i} \qquad (18)$$

where i=1, 2, . . . n and n is the number of concentric circles.

TABLE 6

Concentric Feature Values

| f1 | f2 | f3 | f4 |
| --- | --- | --- | --- |
| 0.0949 | 0.3609 | 0.3179 | 0.2234 |

Figure 16:
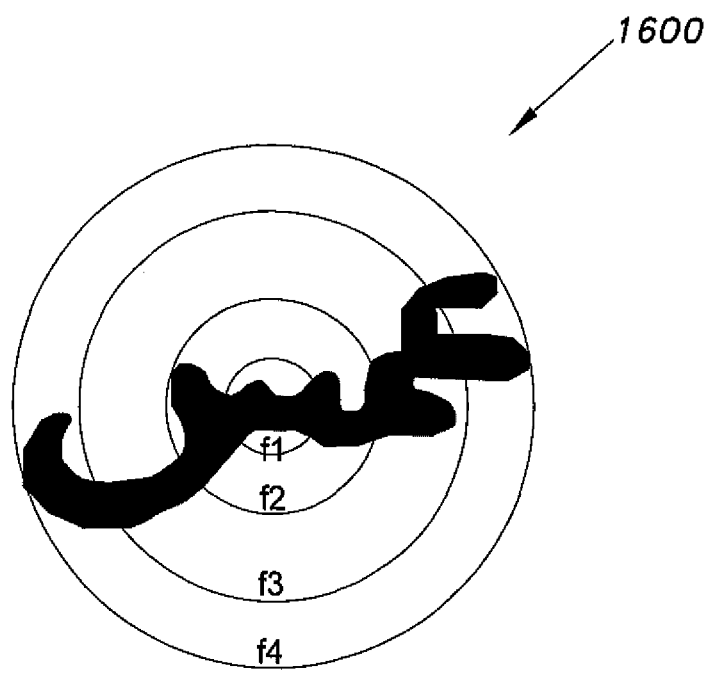
FIG. 16 is a diagram showing 4 concentric circles drawn around a text symbol according the content-based retrieval method of FIG. 1.

FIG. 16 depicts the concentric circle features 1600 while Table 6 includes these normalized features.

Figure 17:
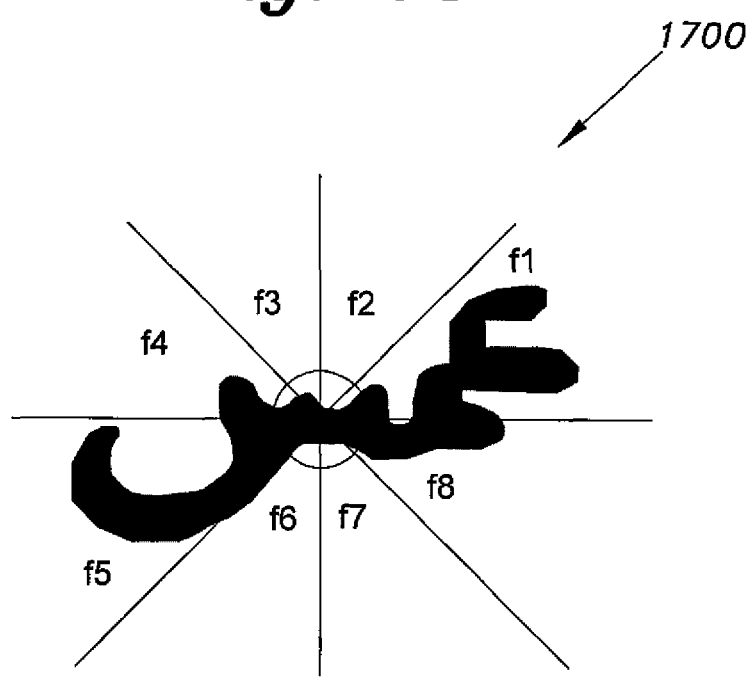
FIG. 17 is a diagram showing 8 angular line features of a text symbol according to the content-based retrieval method of FIG. 1.

Angular line features are computed by counting the number of black pixels in degree slices centered at the centroid of the subword image with respect to the horizontal axis. As a result of this slicing, there are eight features. Then, these values are normalized by the total number of black pixels of the image. FIG. 17 depicts these angular line features 1700 of a given word, while Table 7 includes the eight feature values of that word.

TABLE 7

| Angular Line Feature Values | | | | | | | |
|---|---|---|---|---|---|---|---|
| f1 | f2 | f3 | f4 | f5 | f6 | f7 | f8 |
| 0.36688 | 0.001843 | 0.00553 | 0.11225 | 0.344551 | 0.006452 | 0.00443 | 0.160012 |

The following steps are used to extract a feature set that belongs to the region f1.

First, the centroid, Ctr(xCtr,yCtr), of the image is computed by the present method, which uses algorithm 1.

Second, the present method computes the slope of two lines, m, at θ=0°, 45°, respectively, and centered at centroid, Ctr(x,y), using the following equation:

$$m = \tan(\theta) \quad (19)$$

Third, the following equation is used for a given line:

$$y = mx + b \quad (20)$$

Thus, there are two equations that result from plugging the two different slopes in the above equation:

$$y_1 = m_1 x + b_1 \quad (21)$$

$$y_2 = m_2 x + b_2 \quad (22)$$

Fourth, the present method uses the fact that each line passes through the centroid (xCtr,yCtr) to compute the Y-intercept by using the following equation:

$$b_i = \frac{xCtr - yCtr}{m_i} \quad (23)$$

where i is the line number.

Finally, the present method performs a computation that finds $y_i$ and $y_2$ by plugging the X-coordinate of each black pixel in the equation of lines defined in equation (21). If $y_1 < y \leq y_2$ then, this pixel belongs to the region 1. Practically, the present method computes the count of black pixels within the two angular lines with slope 0 and slope 1 by applying the developed Algorithm 3 detailed in Table 8.

TABLE 8

Computing the Number of Black Pixels Within
the Two Angular Lines (Algorithm 3)

ACTION

Input: Image I, Ctr(xCtr,yCtr)
Output: Count of black pixels
$m_1 \leftarrow \tan(0)$
$m_2 \leftarrow \tan(45)$ $$b_1 = \frac{xCtr - yCtr}{m_1}$$

$$b_2 = \frac{xCtr - yCtr}{m_2}$$

for each pixel p(x,y) in image I
   $y_1 = m_1 x + b_1$
   $y_2 = m_2 x + b_2$
   if $y_1 < y \leq y_2$
     count(1) ← count(1) + 1
   end if
end for The rectangular region features are nine feature values that result from dividing the image area into nine rectangular regions. The count of black pixels is then computed for each region. These values are normalized by the count of all black pixels of the image. Practically, the present method applies the following steps in order to compute these feature values.

First, the present method computes the dimensions, i.e., the height and the width for the rectangular areas:

$$RecRegW = \frac{\text{Img} \cdot \text{Width}}{3} \quad (24)$$

$$RecRegH = \frac{\text{Img} \cdot \text{Height}}{3} \quad (25)$$

Second, the sum of black pixels within each area is calculated using the following equation:

$$RecRegCnt_i = \Sigma_i p(x,y) \quad (26)$$

where i=1, 2, ... n, n=9 is the number of rectangular regions, and p(x,y) is a black pixel.

Figure 18:
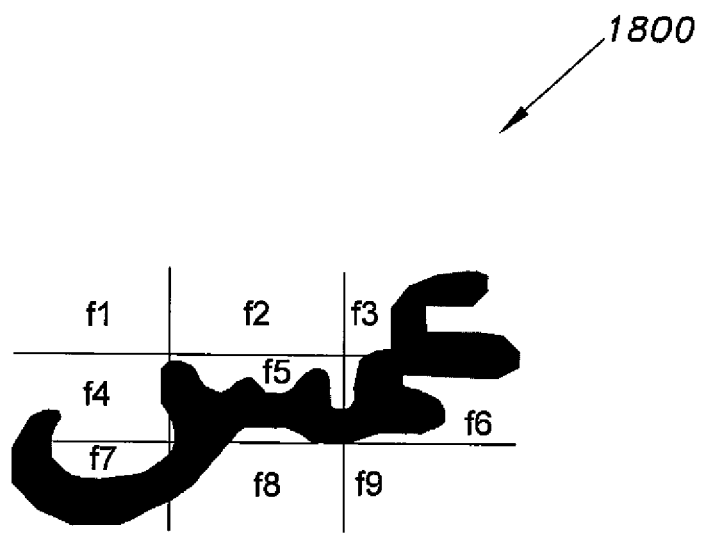
FIG. 18 is a diagram showing 9 rectangular regions over a text symbol according to the content-based retrieval method of FIG. 1.

Third, these feature values are normalized by dividing each rectangular region counter by the subword total black pixel count. FIG. 18 depicts these features 1800 while Table 9 shows the normalized values. For instance, to find the count of black pixels contained in the second rectangular region, the following algorithm detailed in Table 10 is applied.

TABLE 9

| Rectangular Region Feature Values | | | | | | | | |
|---|---|---|---|---|---|---|---|---|
| f1 | f2 | f3 | f4 | f5 | f6 | f7 | f8 | f9 |
| 0 | 0 | 0.2005 | 0.0510 | 0.2682 | 0.2119 | 0.2392 | 0.0290 | 0 |

TABLE 10

Computing the Number of Black Pixels
Within Rectangular Regions (Algorithm 4)

ACTION

Figure 19:
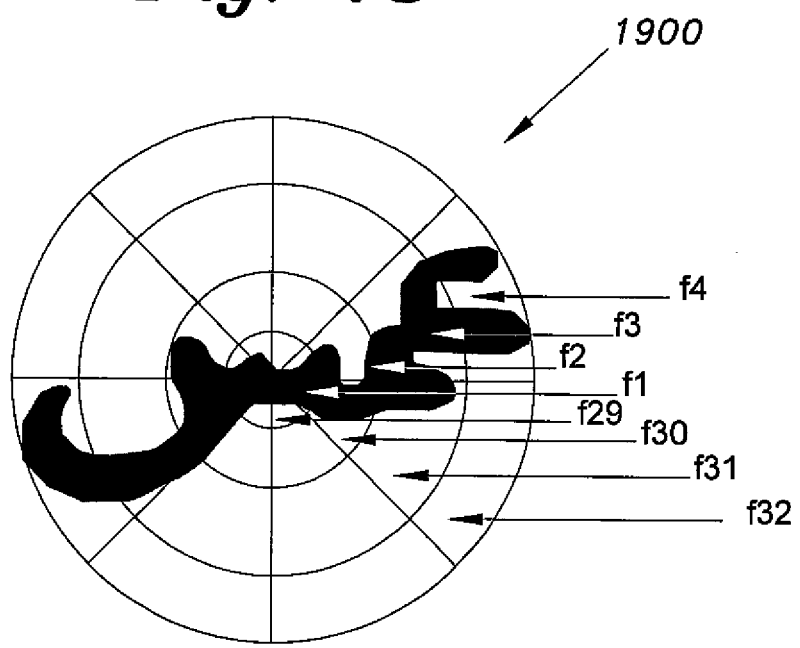
FIG. 19 is a diagram showing 32 circular polar grid features of a text symbol according to the content-based retrieval method of FIG. 1.

Input: Image I
Output: Count of black pixels, count[1:4]

$$RecRegW \leftarrow \frac{\text{Img. Width}}{3}$$

$$RecRegH \leftarrow \frac{\text{Img. Width}}{3}$$

count[1:4] ← 0
for each black pixel p(x,y) in image I
   if 1 ≤ x < RecRegH and RecRegW + 1 ≤ y < RecRegW × 2
     count(2) = count(2) + 1
   end if
end for Circular polar grid features are thirty two values that are calculated by drawing four angular lines with equally-spaced angles i.e., 0°, 45°, 90°, and 135° with respect to the horizontal axis and four concentric circles with radius 1×r, 2×r, . . . , n×r, where n is the number of concentric circles centered at the image centroid. Then the count of black pixels within each region resulting from the intersection of the angular lines and the concentric circles is calculated. Finally, the normalized values of these features are computed by dividing each region's value counter by the total number of black pixels in the subword. In practice, algorithm 5 detailed in Table 11, is applied to calculate the total sum of black pixels within a region resulting from the intersection between the first and the second concentric circles and the two lines with slopes 0 and 1. FIG. 19 depicts these thirty two circular polar grid features 1900, while the normalized values of these features are shown in Table 12.

TABLE 11

Computing the Number of Black Pixels Within the First Sector of Circular Polar Grids (Algorithm 5)

ACTION

Input: Image I, Ctr(xCtr,yCtr), and r[1:2]
Output: Count of black pixels
$m_1 \leftarrow \tan(0)$
$m_2 \leftarrow \tan(45)$ $$b_1 = \frac{xCtr - yCtr}{m_1}$$

$$b_2 = \frac{xCtr - yCtr}{m_2}$$

for each black pixel p(x,y) in image I
$y_1 = m_1 x + b_1$
$y_2 = m_2 x + b_2$
if $y_1 < y \le y_2$
  if $r_2 \le \sqrt{(x - xCtr)^2 + (y - yCtr)^2} < r_2$
    $count(1) \leftarrow count(1) + 1$
  end if
end if
end for

TABLE 12

Some Circular Polar Grid Feature Values

| f1 | f2 | f3 | f4 | f13 | f14 | f16 | f31 | f32 |
|---|---|---|---|---|---|---|---|---|
| 0.0754 | 0.1271 | 0.1356 | 0.1524 | 0.0823 | 0.1304 | 0.0687 | 0 | 0 |

In order to support several processes, such as the query matching process, the present method extracts or creates pieces of information about each subword/word. This information includes the width and the height of the subword image, the centroid, the location of the subword within the line, the page, the manuscript, and the BMP image.

Some of these features, e.g., centroids and dimensions, are used in the feature extraction process. Such information as dimensions, locations and BMP images is used for advanced purposes, such as clustering and displaying retrieved images as thumbnails.

The present Arabic historical manuscripts retrieval method is implemented in the MATLAB 2009b environment and provides a GUI-based, easy to use application. Users can perform several tasks, such as preprocessing steps, segmentation and feature extraction steps, and searching steps. Furthermore, Microsoft Excel is used for storage purposes.

Experimental work using the present method involved the use of two pre-scanned historical Arabic manuscripts. The title of the first one is "Sahih Al-Bukhari" (صحيح البخاري). We used 34 pages from the section of "Mawaqeet Al-Haj wa Al-Umra" (والعمرةالحج مواقيت) of this manuscript. These pages were pre-processed, segmented into lines and words (i.e. connected component), and then the word features were extracted. The overall number of extracted words is about 5,500. The second manuscript is an old Arabic handwritten manuscript that was used in the above cited article by Shahab et al. This manuscript was used for comparison purposes.

We choose 20 words as query words. Some of these words, such as الحج, meaning pilgrimage, may be considered as keywords in order to search particular topics. Names of places and names of people are also selected to be query words. Moreover, phrases such as "peace be upon him" (صلى الله عليه) and "be pleased with him" (عنهرضي الله) are selected to issue queries in order to search prophetic traditions. On the other hand, all of these words consist of one-connected components, two-connected components, three-connected components or four-connected components.

The standard way to evaluate the performance of a system is to compute recall and precision. Recall is measured as the ratio of the number of relevant documents retrieved to the total number of relevant documents that exist in the collection. In other words, recall is a measure of the accuracy of the retrieval. In contrast, precision is measured as the ratio of the number of relevant documents retrieved to the total number of documents retrieved. This is a measure of the completeness of the retrieval. Computations of these measures are as follows.

$$\text{Recall} = \frac{\text{Relevant Images Retrieved}}{\text{Total Relevant Images Present}} \quad (27)$$

$$\text{Precision} = \frac{\text{Relevant Images Retrieved}}{\text{Total Images Retrieved}} \quad (28)$$

Figures 20, 21:
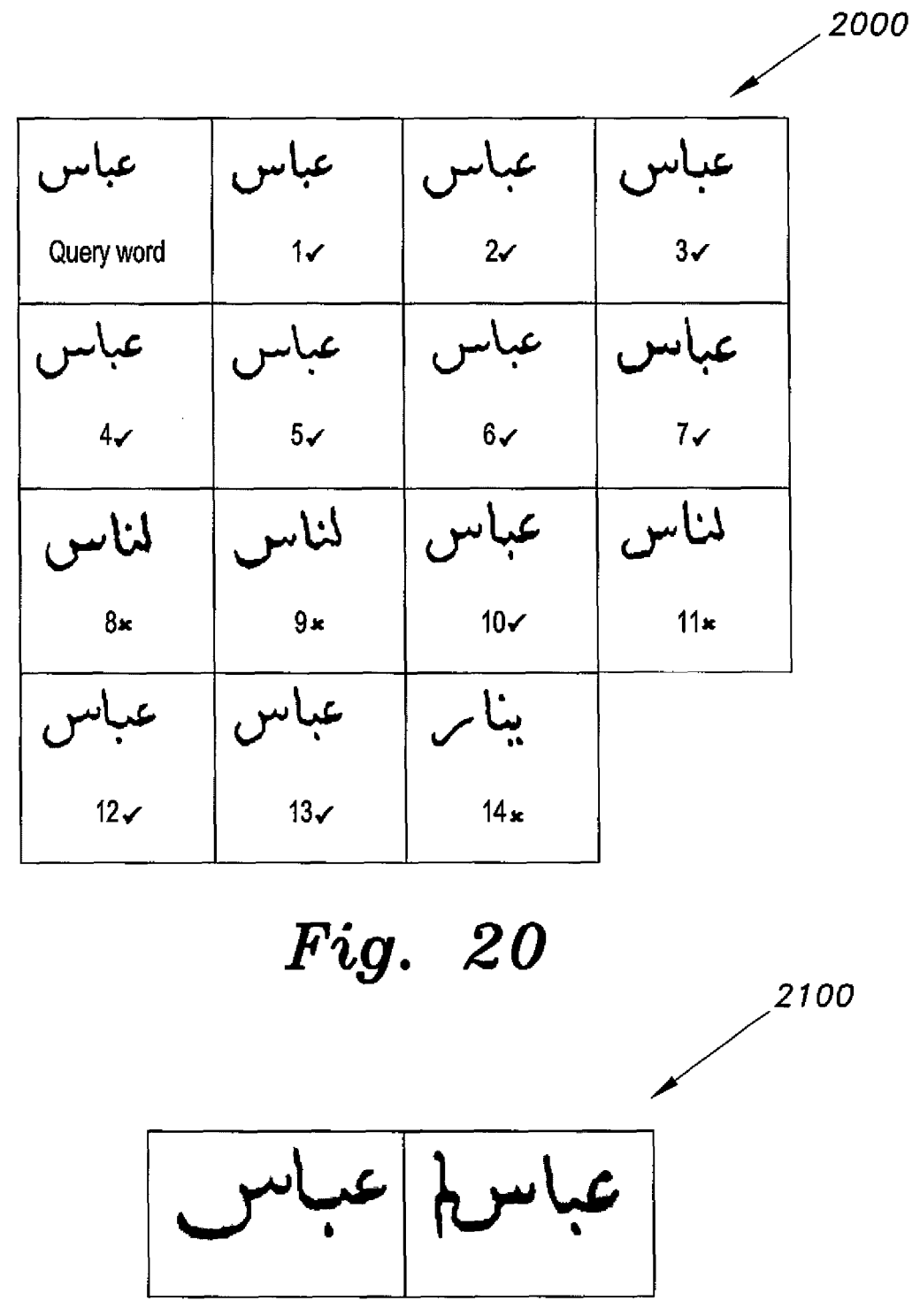
Figures 22, 23:
FIG. 22 is a diagram showing experimental results of another query search for a particular Arabic word using circular polar grid features of a text symbol according to the content-based retrieval method of FIG. 1.
FIG. 23 is a diagram showing discarded words from the query of FIG. 22 using circular polar grid features for the text symbol according to the content-based retrieval method of FIG. 1.
Figures 24, 25:
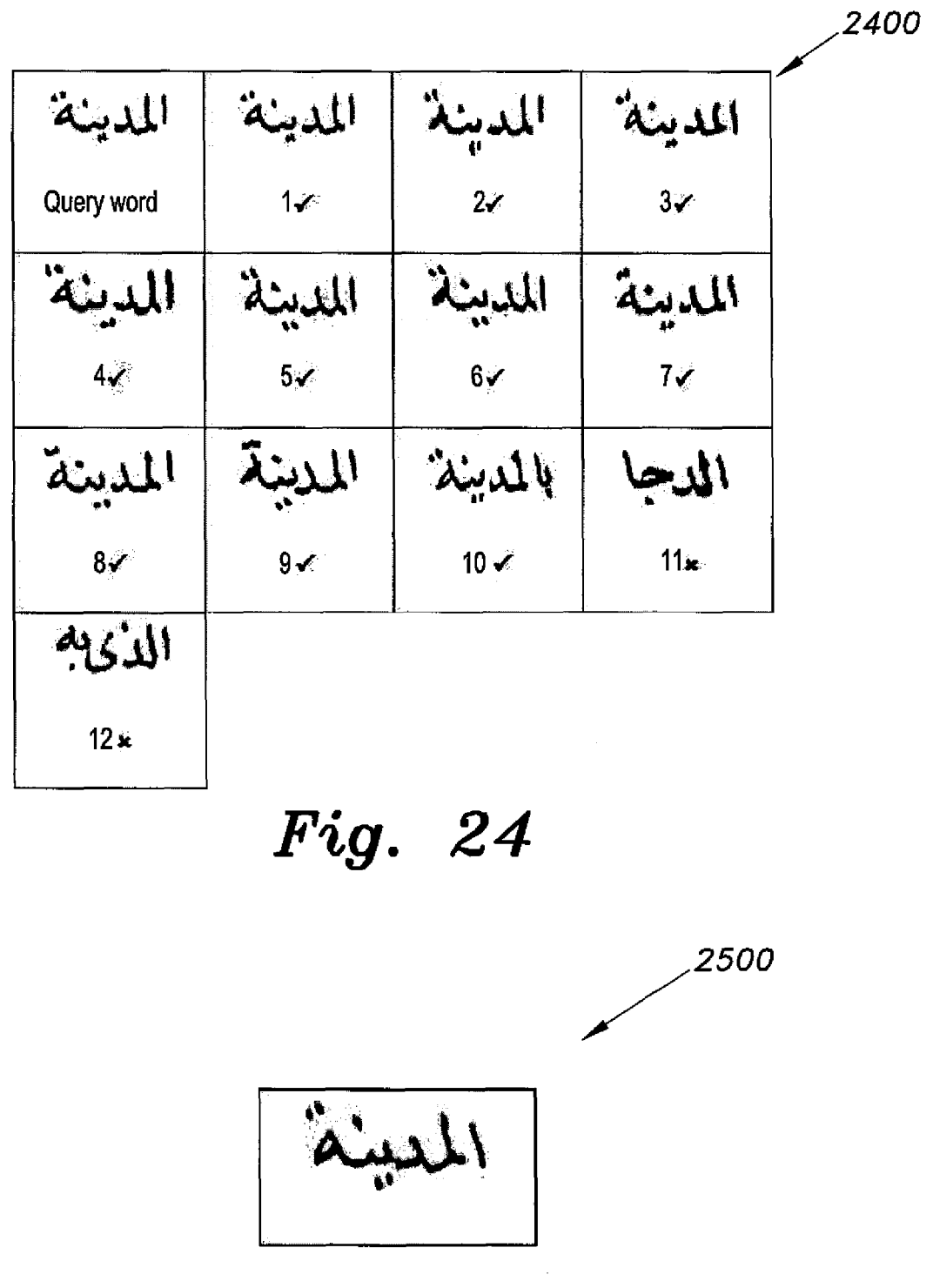
Figure 29A:
FIG. 29A is a diagram showing Circular Polar grid features for a sixth query search for a particular Arabic word using circular polar grid features of a text symbol according to the content-based retrieval method of FIG. 1.
Figure 30A:
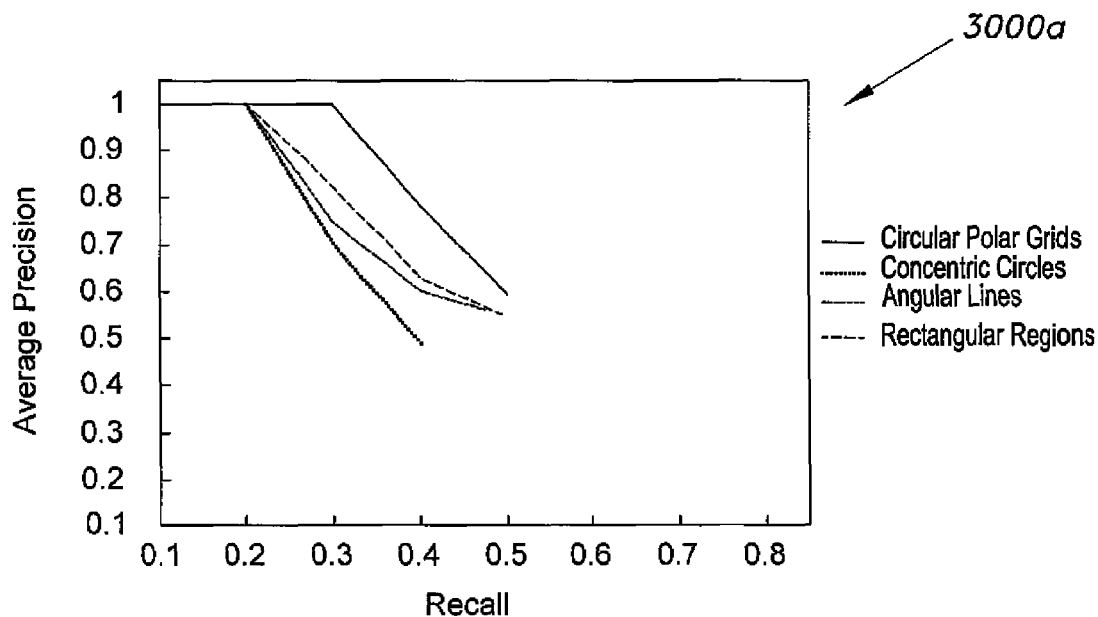
FIG. 30A is an average precision plot of normalized feature values for one-connected components according to the content-based retrieval method of FIG. 1.
Figure 30B:
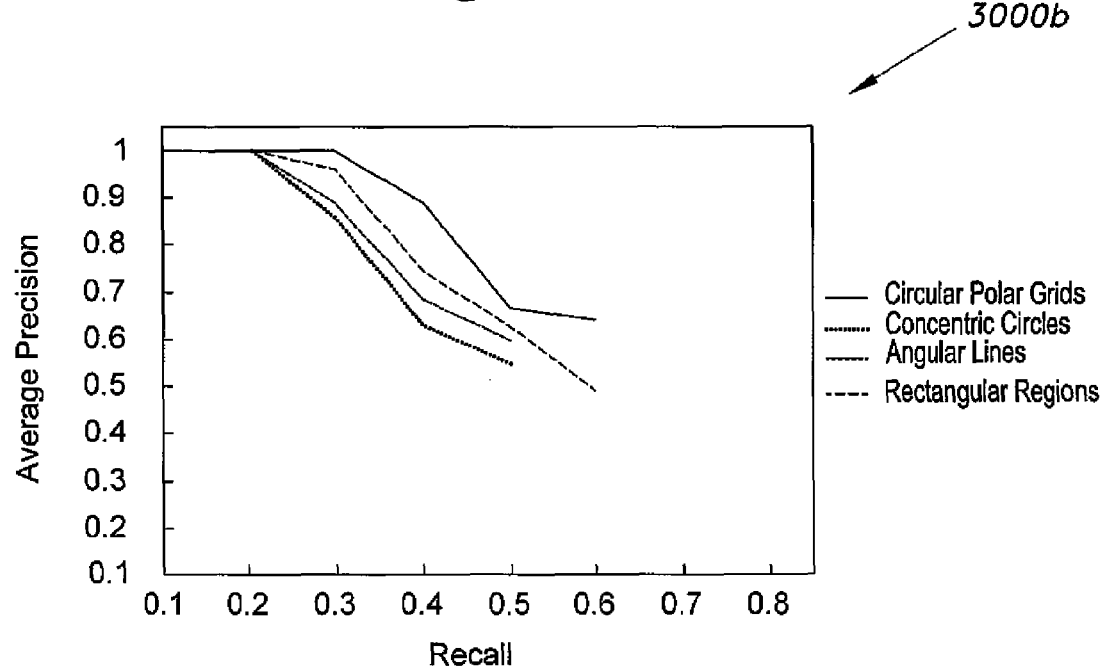
FIG. 30B is an average precision plot of normalized feature values for 2-connected components according to the content-based retrieval method of FIG. 1.
Figure 30C:
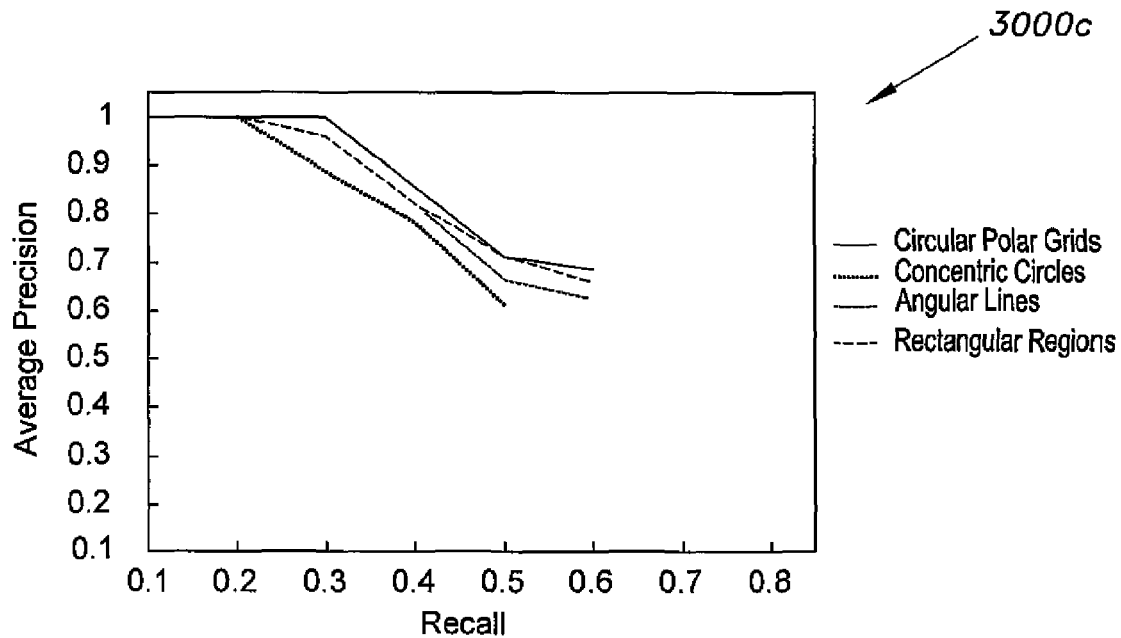
FIG. 30C is an average precision plot of normalized feature values for 3-connected components according to the content-based retrieval method of FIG. 1.
Figure 30D:
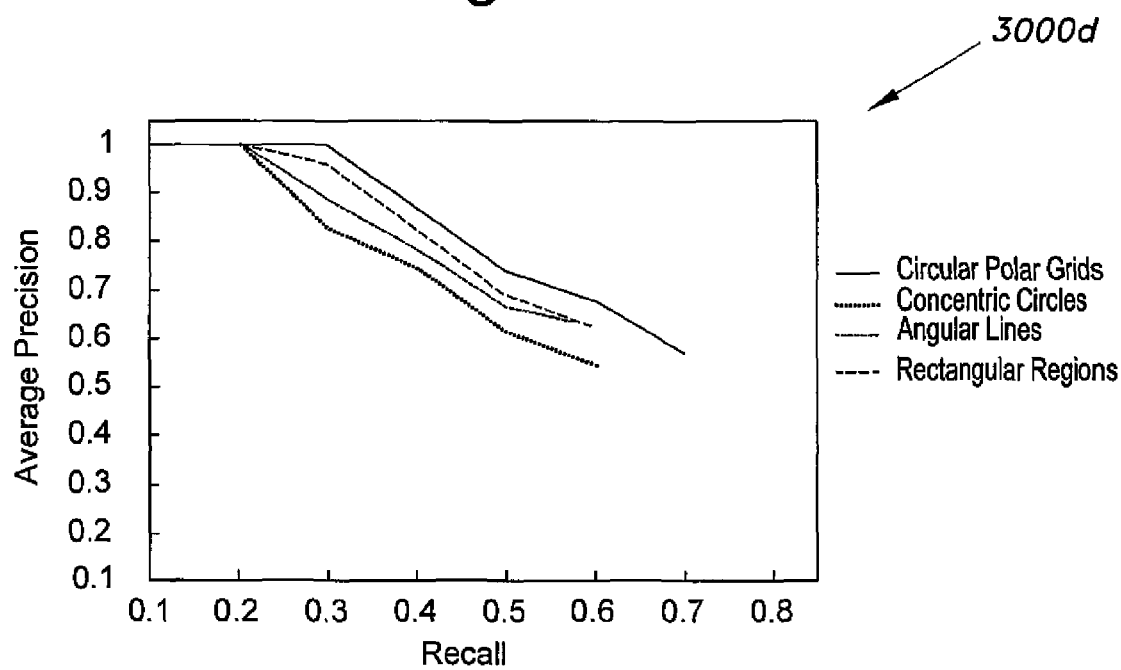
FIG. 30D is an average precision plot of normalized feature values for 4-connected components according to the content-based retrieval method of FIG. 1.
Figure 31A:
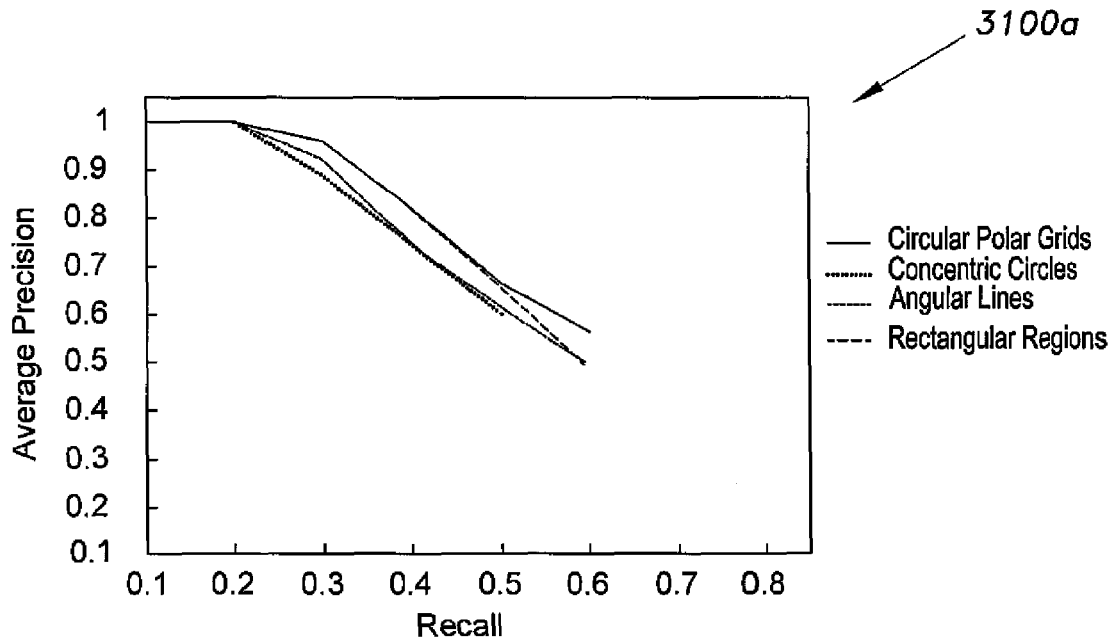
FIG. 31A is an average precision plot of feature occurrence values for one-connected components according to the content-based retrieval method of FIG. 1.
Figure 31B:
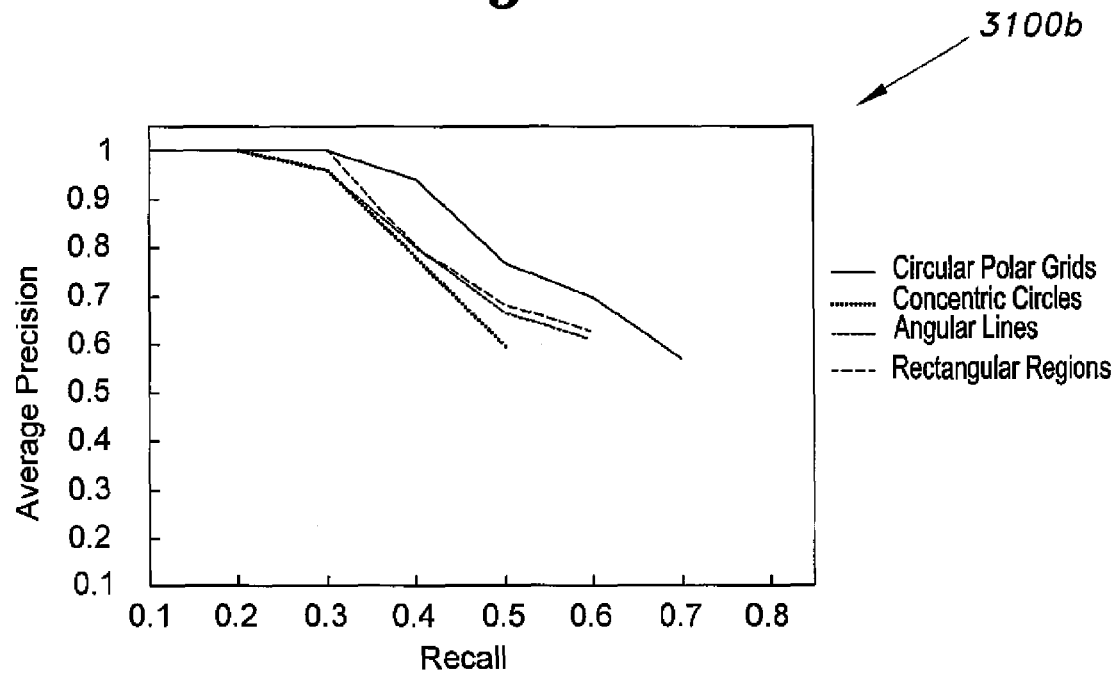
FIG. 31B is an average precision plot of feature occurrence values for 2-connected components according to the content-based retrieval method of FIG. 1.
Figure 31C:
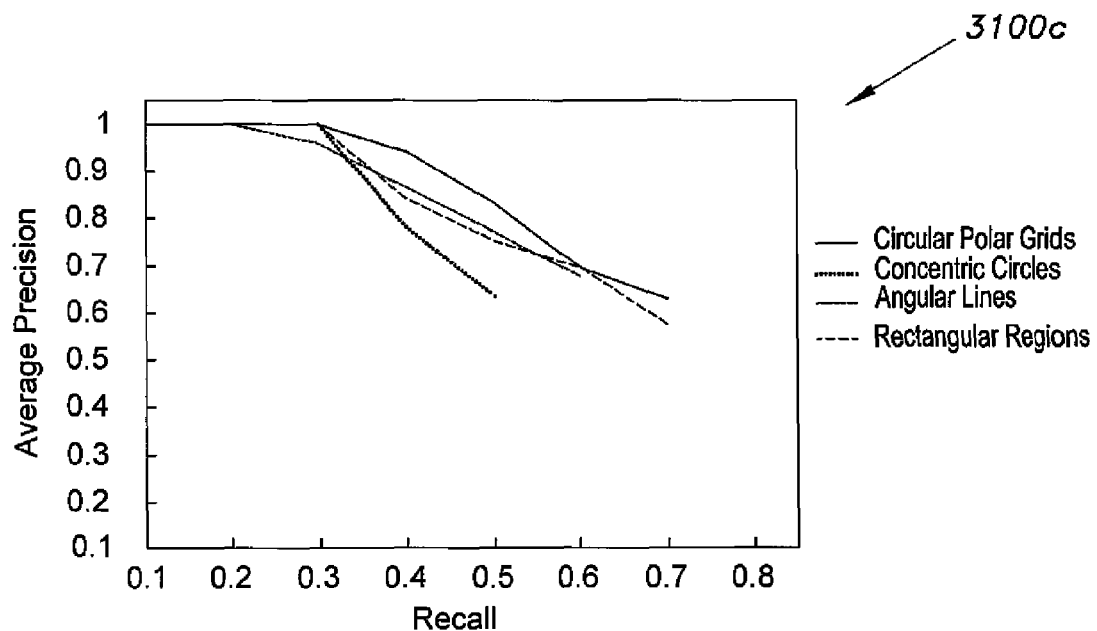
FIG. 31C is an average precision plot of feature occurrence values for 3-connected components according to the content-based retrieval method of FIG. 1.
Figure 31D:
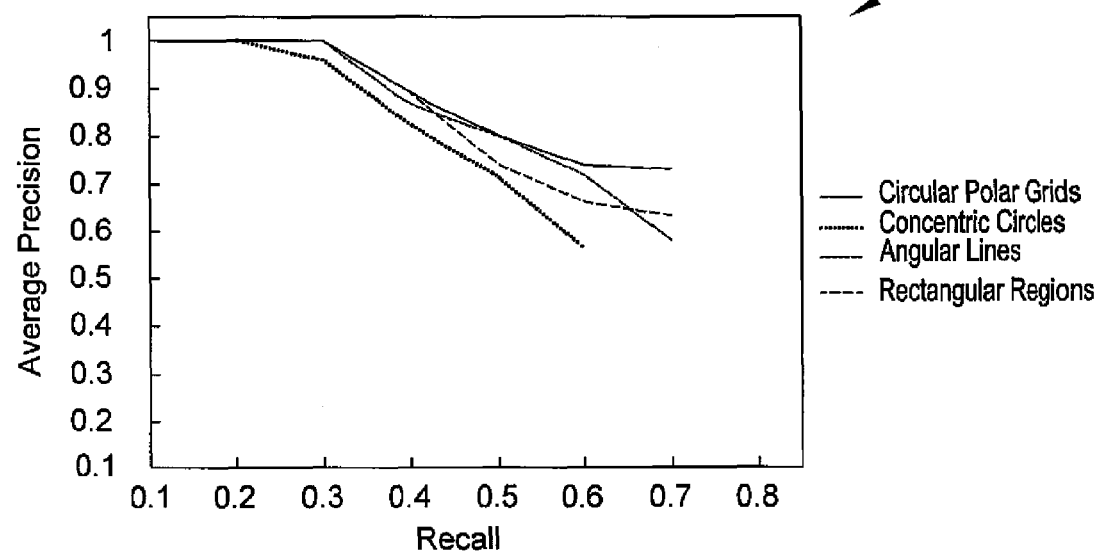
FIG. 31D is an average precision plot of feature occurrence values for 4-connected components according to the content-based retrieval method of FIG. 1.
Figure 32A:
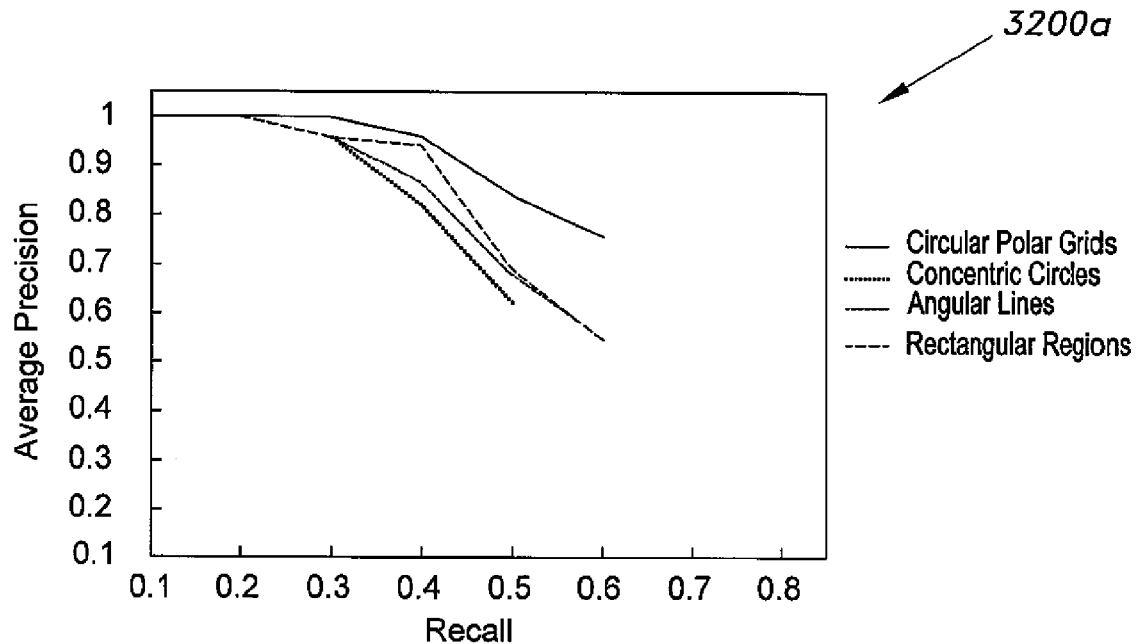
FIG. 32A is an average precision plot of term weighing feature values for one-connected components according to the content-based retrieval method of FIG. 1.
Figure 32B:
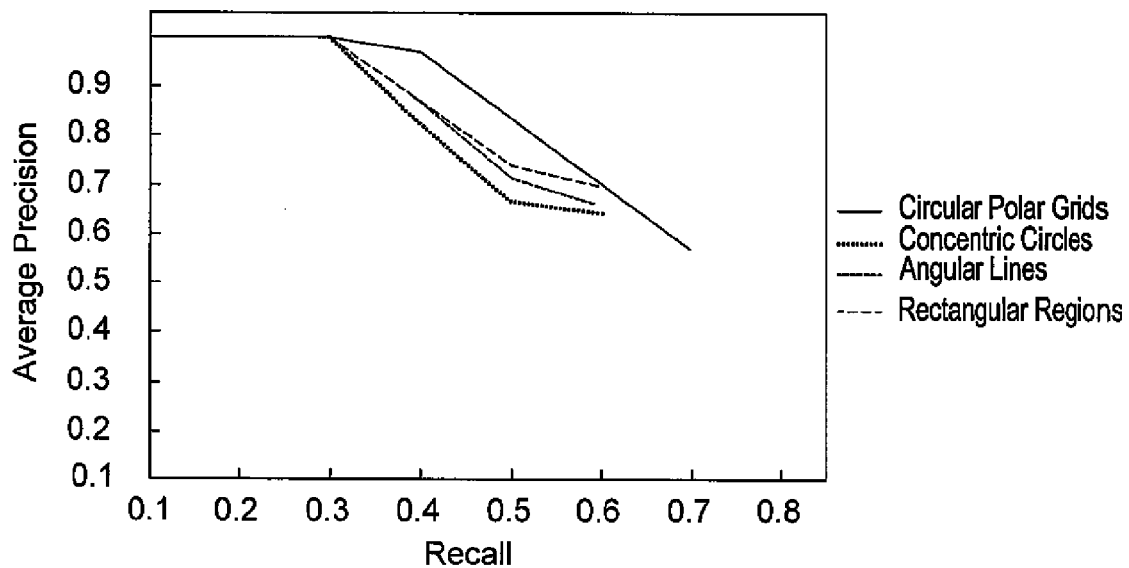
FIG. 32B is an average precision plot of term weighing feature values for 2-connected components according to the content-based retrieval method of FIG. 1.
Figure 32C:
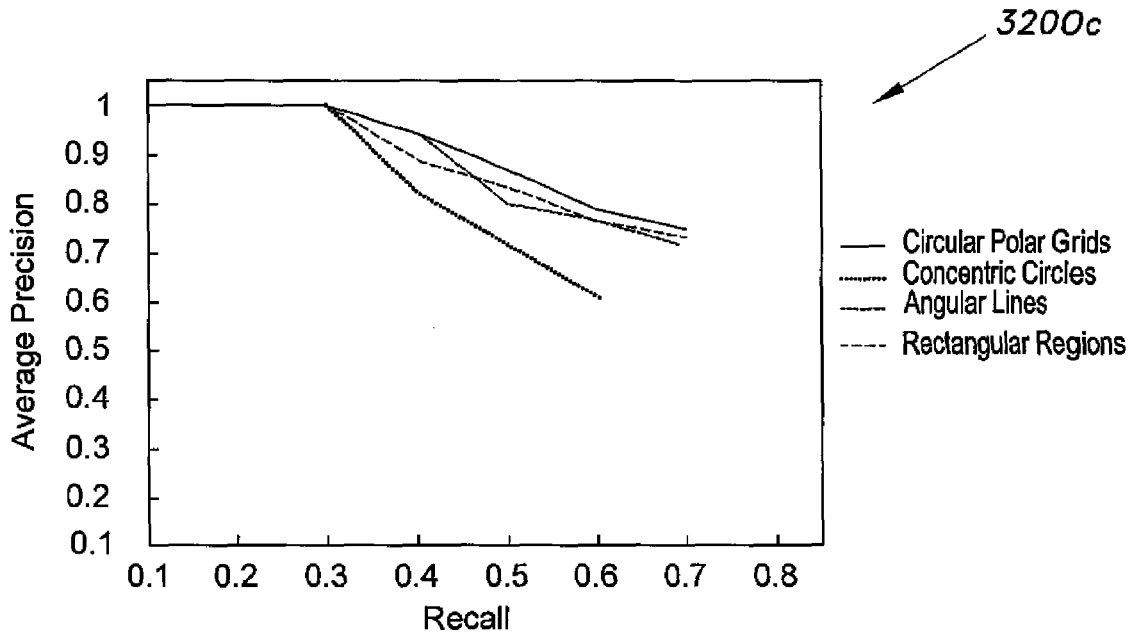
FIG. 32C is an average precision plot of term weighing feature values for 3-connected components according to the content-based retrieval method of FIG. 1.
Figure 32D:
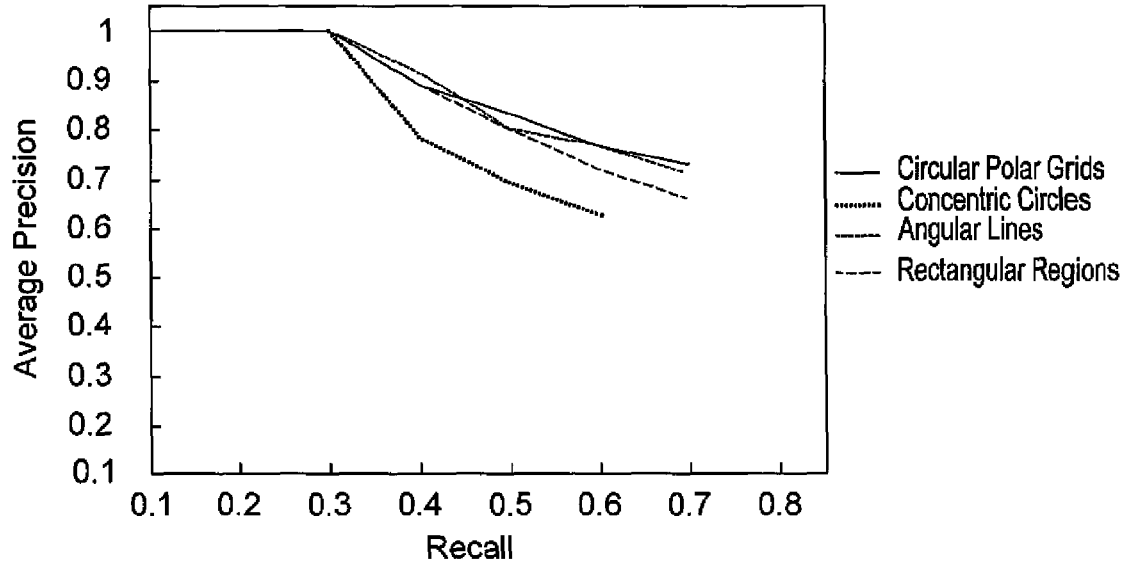
FIG. 32D is an average precision plot of term weighing feature values for 4-connected components according to the content-based retrieval method of FIG. 1.
Figure 33A:
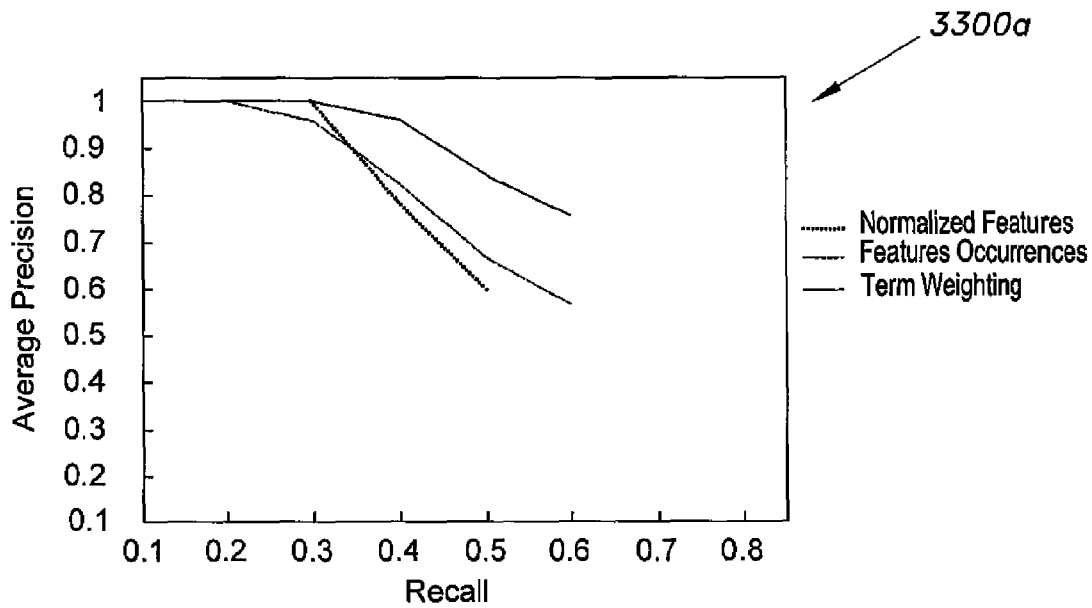
FIG. 33A is an average precision plot of different feature types of circular polar grid features for one-connected components according to the content-based retrieval method of FIG. 1.
Figure 33B:
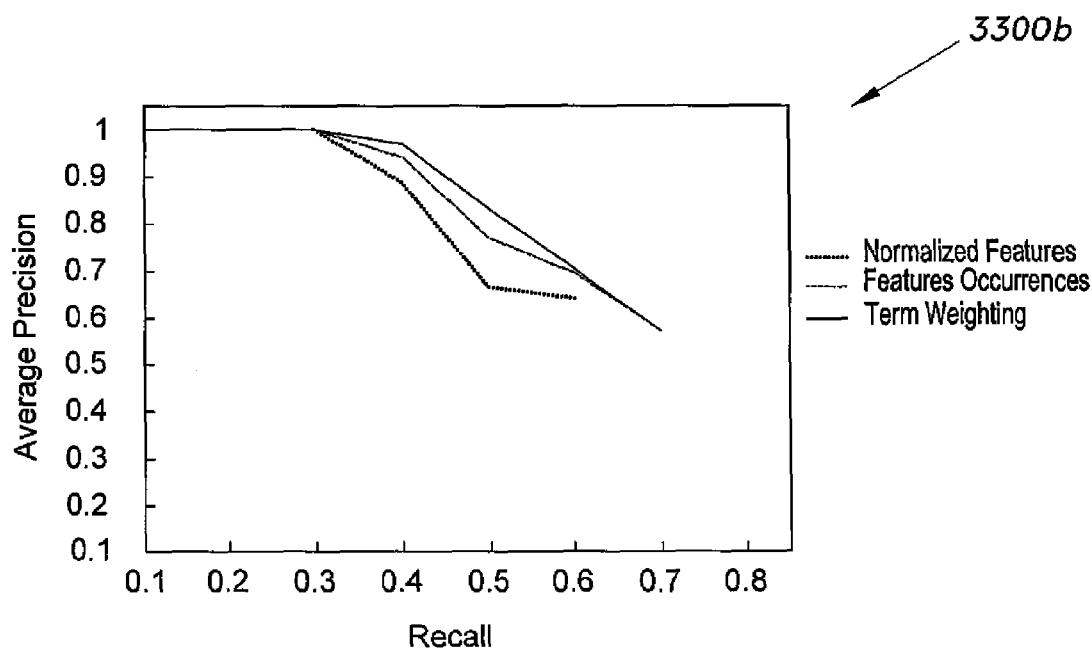
FIG. 33B is an average precision plot of different feature types of circular polar grid features for 2-connected components according to the content-based retrieval method of FIG. 1.
Figure 33C:
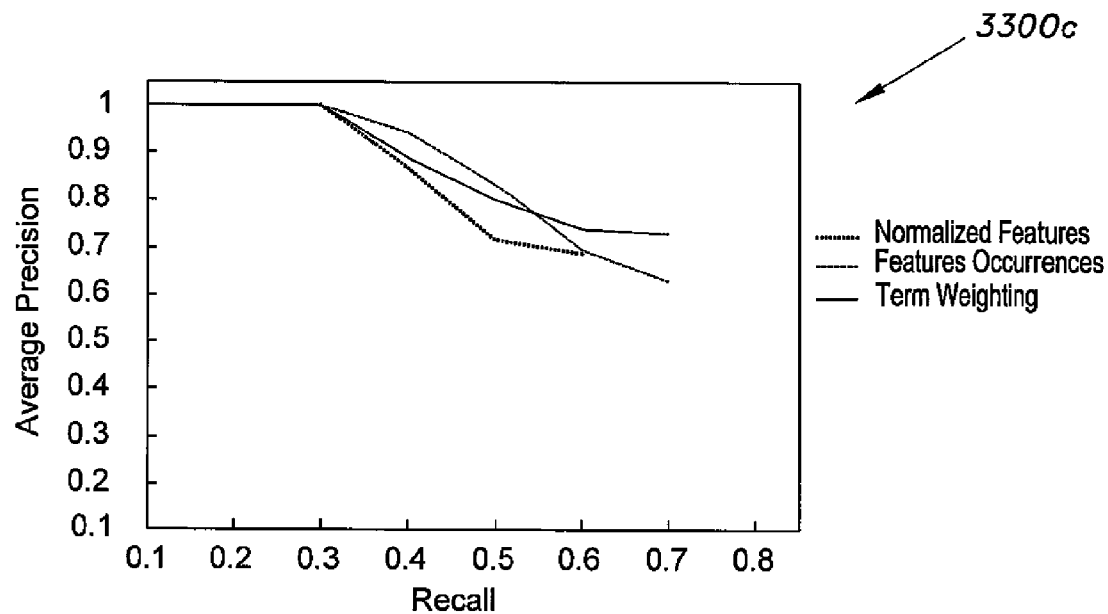
FIG. 33C is an average precision plot of different feature types of circular polar grid features for 3-connected components according to the content-based retrieval method of FIG. 1.
Figure 33D:
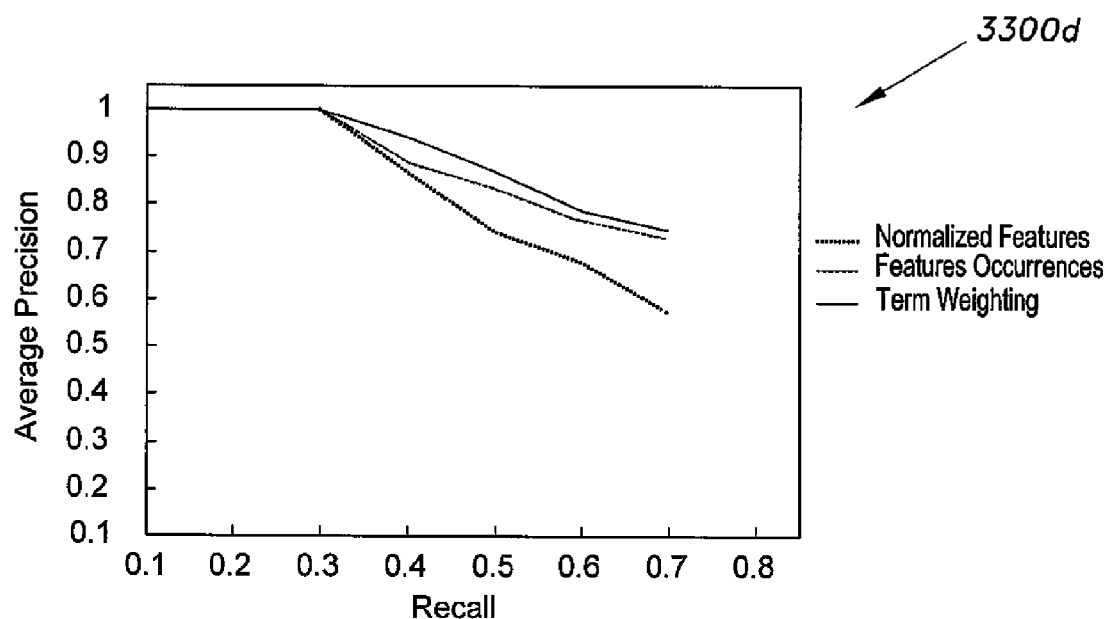
FIG. 33D is an average precision plot of different feature types of circular polar grid features for 4-connected components according to the content-based retrieval method of FIG. 1.

Each one of the four different features used has three different calculated values. The first value is the normalized features, the second value is feature occurrence values, and the third value is term weighting features. Also, we group our query words depending on the number of connected components. Thus, we have 12 feature sets that should be tested on each query word. The goal of the tests is to indicate which feature sets and feature value types will be most useful in indexing and retrieval of manuscripts. The main results from these tests are shown in Table 13, while FIG. 20 results 2000, FIG. 22 results 2200, FIG. 24 results 2400 and FIG. 26 results 2600 show some of these tests using circular polar grid features. In these figures, the cells marked with true symbol correspond to relevant words, while the cells marked with false symbol correspond to non-relevant words. The discarded words are shown in FIG. 21 word 2100, FIG. 23 word 2300, FIG. 25 word 2500, and FIG. 27 word 2700. Some of the reasons that the system discards retrieval of these words are (i) some of these words are concatenating with other words, and (ii) the prolonging of some letters for decorative reasons. FIGS. 28A-28D (2800a-2800d, respectively) and 29A-29D (2900a-2900d, respectively) visualize the experiment results for some selected query words using all feature sets that were used in testing. It is clear that circular polar grid feature sets are the best features over the other feature sets.

TABLE 13

Recall Results of Different Feature Sets

One-Connected Components

| Feature Sets | Normalized | Feature Occurrences | Term Weighting |
|---|---|---|---|
| Concentric Circles | 47.5% | 56.5% | 56.2% |
| Angular Lines | 53.7% | 60% | 60% |
| Rectangular Regions | 53.7% | 60% | 56.7% |
| Circular Polar Grids | 58.7% | 61.2% | 63.7% |

| Feature Sets | Normalized Features | Feature Occurrences | Term Weighting |
|---|---|---|---|

Two-Connected Components

| Concentric Circles | 55% | 57.5% | 63.7% |
| Angular Lines | 58.7% | 62.5% | 65% |
| Rectangular Regions | 60% | 62.5% | 66.2% |
| Circular Polar Grids | 65% | 70% | 70% |

Three-Connected Components

| Concentric Circles | 61.2% | 60% | 62.2% |
| Angular Lines | 62.5% | 70% | 75% |
| Rectangular Regions | 65% | 67.5% | 73.7% |
| Circular Polar Grids | 68.7% | 73.6% | 77.5% |

Four-Connected Components

| Concentric Circles | 61.2% | 61.2% | 63.7% |
| Angular Lines | 65% | 71.2% | 75% |
| Rectangular Regions | 63.7% | 72.5% | 75% |
| Circular Polar Grids | 70% | 77.5% | 78.7 |

The main evident observations from Table 13 are that the term weighting of the circular polar grid feature set, with recall equal to 78.8%, performs better than other feature sets, while the normalized concentric circle feature set is the worst, with recall equal to 47.5%.

Moreover, there is a steadily increasing relationship between the number of connected components and the recall.

We computed average precision over sets of query words in order to represent the performance of the system. Each set contains words that have the same number of connected components. Furthermore, the exact recall points for which we computed the average precision were 0.1, 0.2, 0.3, 0.4, 0.5, 0.6, 0.7, 0.8, 0.9 and 1.0. FIGS. 30A-30D show plots 3000a-3000d, FIGS. 31A-31D show plots 3100a-3100d, and FIGS. 32A-32D show plots 3200a-3200d, which represent the performance of the system, while FIGS. 33A-33D show plots 3300a-3300d, which represent the performance of the system using circular polar grid features.

From the above figures (i.e. FIGS. 30A-30D, 31A-31D and 32A-32D), we can observe the line slope of each figure downwards from left to right, enforcing the notion that as more relevant words are retrieved (recall increase), the more non-relevant words are retrieved (precision decreases). Moreover, the circular polar grid features set performs better than other feature sets, while the concentric circle features set is the worst.

Additionally, the angular line feature set and the rectangular feature set perform next best. These two feature sets do not differ significantly from each other. As evident from FIGS. 33A-33D, which related to the best feature sets, i.e., circular polar grid features, the average precision for all of feature types, viz., normalized features, feature occurrences, and term-weighting features, increases steadily with the number of connected components.

The similarity in the present method depends on the choice of the threshold value specified by how far the query word(s) is from the stored word(s) in the database. Therefore, when there is an exact match, i.e., the angle between the two is equal to zero, the cosine value is equal to 1. Since it is unlikely that an exact match occurs, we need to choose a suitable threshold that will be used to retrieve candidate words. In order to determine the value of that suitable threshold, we tested the present method with three threshold values, viz., 0.6, 0.7 and 0.8. We used these values such that if the cosine of the angle between a query and a word is greater than or equal to that threshold value, the word is retrieved. We carried out this experiment with nine queries. Table 14 shows the query words along with the precision and recall results associated with each query for the three different threshold values. In order to determine the most suitable threshold, Table 15 shows the number of retrieved results for different precision recall pairs. In this table, with the exception of precision recall pair values equal to (0.8,0.8) and threshold value equal to 0.8, we found that the threshold value equal to 0.7 along with recall precision pairs is suitable threshold for retrieving relevant results more than the other two threshold values.

TABLE 14

Recall and Precision Results Using Different Threshold Values

| Query Words | Total | Threshold | Total | Relevant | Non- | Precision | Recall |
|---|---|---|---|---|---|---|---|
| عمر | 24 | 0.6 | 59 | 22 | 37 | 0.37 | 0.91 |
|  |  | 0.7 | 44 | 19 | 25 | 0.43 | 0.79 |
|  |  | 0.8 | 34 | 15 | 19 | 0.44 | 0.62 |
| صلى | 75 | 0.6 | 107 | 68 | 39 | 0.63 | 0.9 |
|  |  | 0.7 | 98 | 65 | 33 | 0.66 | 0.86 |
|  |  | 0.8 | 72 | 55 | 17 | 0.76 | 0.73 |
| عباس | 12 | 0.6 | 51 | 11 | 40 | 0.21 | 0.91 |
|  |  | 0.7 | 17 | 10 | 7 | 0.58 | 0.83 |
|  |  | 0.8 | 10 | 9 | 1 | 0.9 | 0.75 |
| عائشة | 10 | 0.6 | 54 | 9 | 45 | 0.16 | 0.9 |
|  |  | 0.7 | 35 | 9 | 26 | 0.25 | 0.9 |
|  |  | 0.8 | 29 | 9 | 20 | 0.31 | 0.9 |
| المدينة | 12 | 0.6 | 29 | 10 | 19 | 0.34 | 0.83 |
|  |  | 0.7 | 16 | 10 | 6 | 0.62 | 0.83 |
|  |  | 0.8 | 6 | 6 | 0 | 1 | 0.5 |
| رسول | 29 | 0.6 | 33 | 22 | 11 | 0.66 | 0.75 |
|  |  | 0.7 | 24 | 19 | 5 | 0.79 | 0.65 |
|  |  | 0.8 | 13 | 13 | 0 | 1 | 0.44 |
| الشام | 8 | 0.6 | 15 | 8 | 7 | 0.53 | 1 |
|  |  | 0.7 | 11 | 8 | 3 | 0.72 | 1 |
|  |  | 0.8 | 7 | 7 | 0 | 1 | 0.87 |
| صلى الله | 64 | 0.6 | 86 | 55 | 31 | 0.63 | 0.85 |
|  |  | 0.7 | 63 | 45 | 18 | 0.71 | 0.70 |
|  |  | 0.8 | 35 | 30 | 5 | 0.85 | 0.46 |
| الحج و العمرة | 8 | 0.6 | 22 | 6 | 16 | 0.27 | 0.75 |
|  |  | 0.7 | 19 | 6 | 13 | 0.31 | 0.75 |
|  |  | 0.8 | 7 | 5 | 2 | 0.71 | 0.62 |
| رضى الله | 28 | 0.6 | 35 | 24 | 11 | 0.68 | 0.85 |
|  |  | 0.7 | 27 | 22 | 5 | 0.81 | 0.78 |
|  |  | 0.8 | 21 | 19 | 2 | 0.90 | 0.67 |

TABLE 15

Number of Results Where the Precision/Recall Pair for Some Queries Is
At Least As Specified in Each Column for Different Threshold Values

| (Precision, Recall) | (0.9, 0.9) | (0.8, 0.8) | (0.7, 0.7) | (0.6, 0.6) | (0.5, 0.5) |
|---|---|---|---|---|---|
| Threshold = 0.6 | 0 | 0 | 0 | 4 | 5 |
| Threshold = 0.7 | 0 | 0 | 3 | 6 | 7 |
| Threshold = 0.8 | 0 | 1 | 3 | 5 | 6 |

Figures 34, 35:
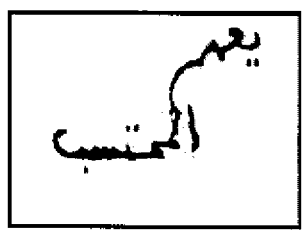
FIG. 34 is a diagram showing experimental results of a query search for a particular Arabic word using circular polar grid features of a text symbol according to the content-based retrieval method of FIG. 1.
FIG. 35 is a diagram showing discarded words from the query of FIG. 34 using circular polar grid features for the text symbol according to the content-based retrieval method of FIG. 1.
Figure 36:
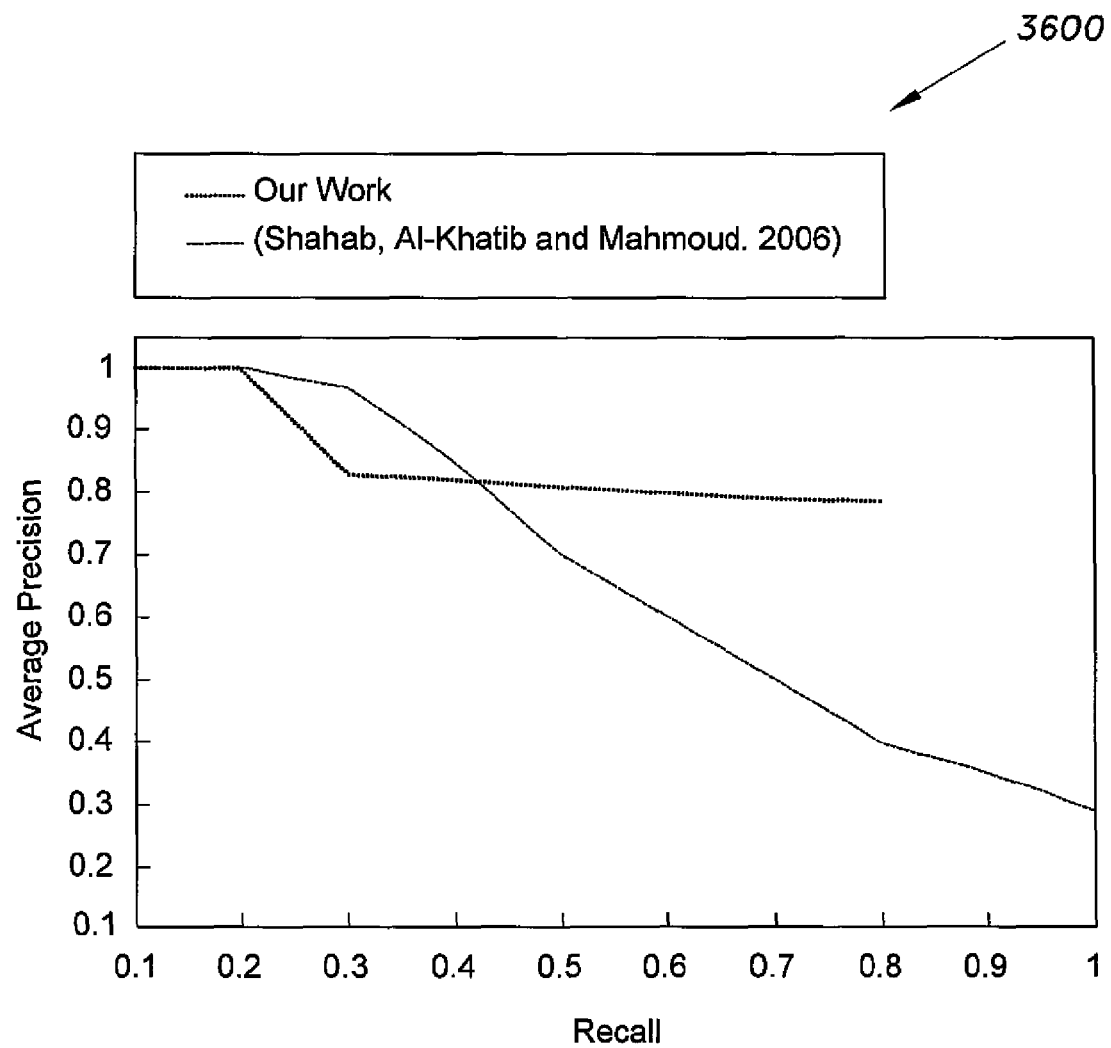
FIG. 36 shows a comparison plot of the content-based retrieval method of FIG. 1 vs. a method of the prior art.

Testing of the present method used the same manuscript and the same query words that were used in the above cited journal article by Shahab et al, The recognition rate of the present method was compared with other work. The recognition rate of the other work is about 76%, while the recognition rate of the present method for the same manuscript is 78.7%. Table 16 shows the experimental results of our system for the same query words, while the retrieval results for the query word Al-Muhtasib (المحتسب) are shown in the diagram 3400 of FIG. 34. In this figure, the cells marked with true symbol correspond to relevant words, while the cells marked with false symbol correspond to non-relevant words. The discarded words are shown in diagram 3500 of FIG. 35. The reason that the system discards retrieval of this word is that this word is concatenating with other words. One of the reasons that our work yields a better performance compared to the results reported by the other is that the precision here is better than the other. For example, the number of all retrieved words for the Al-Muhatsib word in the related art system is 68 words, while in the present method the number is 23. Plot 3600 of FIG. 36 shows the average precision of the present method vs. the related art retrieval system disclosed in the journal article "Computer Aided Indexing of Historical Manuscripts". We observe that overall the average precision of the present method is better than the related art work.

TABLE 16

Comparison to Shahab et al. for the Same Query Words

| Query word | Total words Present | Total of Relevant Retrieved Words |
|---|---|---|
| فصــل | 10 | 5 |
| الحســبة | 17 | 14 |
| المحتســب | 18 | 17 |
| البــاب | 16 | 13 |
| صــلى الله | 5 | 3 |

An indexing and searching system for Arabic historical manuscript is developed and implemented. There are several modules, such as preprocessing module, segmentation module, and features extraction module, which are applied before constructing the term-by-document matrix. Such features as concentric circular, angular lines, rectangular regions, and circular polar grids are extracted from the word images. Latent Semantic Indexing (LSI) is employed to represent subword images and their corresponding features as a term-by-document matrix. Query-matching mechanisms are applied in order to retrieve candidate words. Additionally, setting a threshold for similarity matching using LSI is less dependent on the underlying features. The performance evaluation is measured using recall and precision. Our system shows encouraging results and is able to retrieve relevant words. Additionally, the newly proposed circular polar grid of the present method performs better than previously used feature sets for automatic indexing of Arabic handwritten manuscripts.

It is to be understood that the present invention is not limited to the embodiments described above, but encompasses any and all embodiments within the scope of the following claims.

We claim:

1. A computer-implemented method for retrieval of Arabic historical manuscripts, comprising the steps of:
   entering Arabic historical manuscript images into a computer for processing;
   extracting circular polar grid features from the Arabic historical manuscript images stored in the computer, wherein the step of extracting circular polar grid features comprises:
   building a circular polar grid from a multiline-axis including an intersection of a 0° line, a 45° line, a 90° line and a 135° line;
   overlaying concentric circles centered about the intersection point of said multiline-axis, the concentric circles having radial values of r, 2r, 3r, . . . nr; and
   centering said circular polar grid at a centroid of an image term to be indexed;
   constructing a Latent Semantic Index based on the extracted circular polar grid features, the Latent Semantic Index having a reduced dimension m×n Term-by-Document matrix obtained from a Singular Value Decomposition of a higher dimensional Term-by-Document matrix constructed by the computer from the extracted circular polar grid features, wherein m rows represent the features and n columns represent the images;
   accepting a user query against the stored Arabic historical manuscript images, the computer forming the user query as a query vector derived from features extraction of a query image supplied by the user;
   performing query matching based on comparison between the query vector and the Term-by-Document matrix;
   weighing each term of said Term-by-Document matrix by a value representing an occurrence frequency of a feature of said term in said document, wherein the step of weighing each term of said Term-by-Document matrix comprises:
   picking a comprehensive training set of said document for each said feature;
   calculating a mean $\mu_f$ and a standard deviation $\sigma_f$ of the features f's value across the training set; and
   for each image in the collection, defining an occurrence count $O_{fj}$ of feature f according to the relation:

$$O_{fj} = \begin{cases} \left\lceil \dfrac{val_{fj} - \mu_f}{\sigma_f} \right\rceil & \text{if } val_{fj} > \mu_f \\ 0 & \text{otherwise} \end{cases}$$

where $val_{fj}$ is the value of the feature f in image j; and
   displaying Arabic historical document images returned by the query matching process performed by the computer, the returned document images being ranked by similarity to the user query according to a predetermined distance measurement between the query vector and the Term-by-Document matrix, wherein the computer determines a plurality of image features defined by a count of black image pixels found in regions of intersection between said multilines and said concentric circles.

2. The computer-implemented method according to claim 1, wherein said number of concentric circles is four, thereby defining 32 regions of intersection between said multilines and said concentric circles.

3. The computer-implemented method according to claim 1, further comprising the step of, for each of said regions, normalizing said count.

4. The computer-implemented method according to claim 1, further comprising the step of calculating said predetermined distance measurement as a cosine between said query vector, and said Term-by Document matrix.

5. The computer-implemented method according to claim 1, further comprising preprocessing steps adapted for enhancing efficiency of said circular polar grid features extraction step.

6. The computer-implemented method according to claim 5, wherein said preprocessing steps include an RGB conversion procedure comprising the steps of:
converting said Arabic historical manuscript images from an RGB color space to gray-scale images;
converting said gray-scale images to binary images by performing calculations characterized by the relation:

$$I_{binary}(n, m) = \begin{cases} 1 & \text{if } I_{grayscale}(n, m) > T \\ 0 & \text{otherwise} \end{cases}$$

where T is an intensity threshold, $I_{grayscale}$ is a grayscale image, $I_{binary}$ is a binary image and (n, m) are the coordinates of an individual pixel within said gray-scale image and said binary image.

7. The computer-implemented method according to claim 5, wherein said preprocessing steps include a smoothing and noise removal procedure comprising the steps of:
accepting as input binary versions of said Arabic historical manuscript images;
providing as output said binary versions of said Arabic historical manuscript images processed according to rules characterized by the relation if $P_0=0$ then:

$$\acute{P}_0 = \begin{cases} 0 & \text{if } \sum_{i=1}^{8} P_i > T \\ 1 & \text{otherwise} \end{cases}$$

else:

$$\acute{P}_0 = \begin{cases} 1 & \text{if } p_i + p_{i+1} = 2 \text{ for at least one } i = 1, 2, \ldots, 8 \\ 0 & \text{otherwise} \end{cases}$$

where $P_0$ is the current pixel value, $\acute{P}_0$ the new pixel value and T is the threshold.

8. The computer-implemented method according to claim 5, wherein said preprocessing steps include a segmentation procedure comprising the steps of:
determining a baseline of text of said Arabic historical manuscripts images by calculating a horizontal projection profile, said horizontal projection profile calculation being characterized by the relation:

$P_i = \Sigma \text{Img}(i,j)$ where P(i,j) is the horizontal projection of the image for row i, and the Img(i,j) is the pixel value at (i, j);
based on said baseline determination, segmenting a line image to connected component images comprised of subwords of said images; and
tagging each said subword with page number and line number information to facilitate storage and retrieval of said image subword.

9. The computer-implemented method according to claim 8, wherein said returned document images display step further comprises displaying image thumbnails of said image subwords matched according to said query matching process.

10. A computer software product embedded in a non-transitory storage medium readable by a processor, the non-transitory storage medium having stored thereon a set of instructions which, when executed by the processor, causes a computer to perform retrieval of Arabic historical manuscripts using Latent Semantic Indexing, comprising:
(a) a first sequence of instructions which, when executed by the processor, causes said processor to accept in main memory storage Arabic historical manuscript images for processing;
(b) a second sequence of instructions which, when executed by the processor, causes said processor to extract circular polar grid features from said Arabic historical manuscript images stored in said main memory storage;
(c) a third sequence of instructions which, when executed by the processor, causes said processor to construct a Latent Semantic Index based on said extracted circular polar grid features, said Latent Semantic Index being comprised of a reduced dimension m×n Term-by-Document matrix obtained from a Singular Value Decomposition of a higher dimensional Term-by-Document matrix constructed by said computer from said extracted circular polar grid features, wherein m rows represent said features and n columns represent said images;
(d) a fourth sequence of instructions which, when executed by the processor, causes said processor to accept a user query against said stored Arabic historical manuscript images, and to form said user query as a query vector derived from features extraction of a query image supplied by said user;
(e) a fifth sequence of instructions which, when executed by the processor, causes said processor to perform query matching based on comparison between said query vector and said Term-by-Document matrix;
(f) a sixth sequence of instructions which, when executed by the processor, causes said processor to display Arabic historical document images returned by said query matching process, said returned document images being ranked by similarity to said user query according to a predetermined distance measurement between said query vector and said Term-by-Document matrix;
(g) a seventh sequence of instructions which, when executed by the processor, causes said processor to build said circular polar grid from a multiline-axis comprised of the intersection of a 0° line, a 45° line, a 90° line and a 135° line;
(h) an eighth sequence of instructions which, when executed by the processor, causes said processor to overlay concentric circles centered about the intersection point of said multiline-axis, said concentric circles having radial values of r; 2r, 3r, . . . nr; and
(i) a ninth sequence of instructions which, when executed by the processor, causes said processor to center said circular polar grid at a centroid of an image term to be indexed by said retrieval process;
(j) a tenth sequence of instructions which, when executed by the processor, causes said processor to determine a plurality of image features defined by a count of black image pixels found in regions of intersection between said multilines and said concentric circles;

(k) an eleventh sequence of instructions which, when executed by the processor, causes said processor to weigh each term of said Term-by-Document matrix by a value representing an occurrence frequency of a feature of said term in said document;

(l) a twelfth sequence of instructions which, when executed by the processor, causes said processor to pick a comprehensive training set of said document for each said feature;

(m) a thirteenth sequence of instructions which, when executed by the processor, causes said processor to calculate the mean $\mu_f$ and the standard deviation $\sigma_f$ of the features f's value across the training set and, for each image in the collection, causes said processor to define the occurrence count $O_{fi}$ of feature f according to the relation $$O_{fi} = \begin{cases} \left\lceil \frac{val_{fi} - \mu_f}{\sigma_f} \right\rceil & \text{if } val_{fi} > \mu_f \\ 0 & \text{otherwise} \end{cases}$$

where $val_{fi}$ is the value of the feature f in image i;

(n) a fourteenth sequence of instructions which, when executed by the processor, causes said processor to convert said Arabic historical manuscript images from an RGB color space to gray-scale images and causes said processor to convert said gray-scale images to binary images by performing calculations characterized by the relation $$I_{binary}(n, m) = \begin{cases} 1 & \text{if } I_{grayscale}(n, m) > T \\ 0 & \text{otherwise} \end{cases}$$

where T is an intensity threshold, $I_{grayscale}$ is a grayscale image, $I_{binary}$ is a binary image and (n, m) are the coordinates of an individual pixel within said gray-scale image and said binary image;

(o) a fifteenth sequence of instructions which, when executed by the processor, causes said processor to accept as input binary versions of said Arabic historical manuscript images and causes said processor to provide as output said binary versions of said Arabic historical manuscript images processed according to rules characterized by the relation if $P_0=0$ then:

$$\acute{P}_0 = \begin{cases} 0 & \text{if } \sum_{i=1}^{8} P_i > T \\ 1 & \text{otherwise} \end{cases}$$

else:

$$\acute{P}_0 = \begin{cases} 1 & \text{if } p_i + p_{i+1} = 2 \text{ for at least one } i = 1, 2, \ldots, 8 \\ 0 & \text{otherwise} \end{cases}$$

where $P_0$ is the current pixel value, $\acute{P}_0$ the new pixel value and T is the threshold;

(p) a sixteenth sequence of instructions which, when executed by the processor, causes said processor to determine a baseline of text of said Arabic historical manuscripts images by calculating a horizontal projection profile, said horizontal projection profile calculation being characterized by the relation:

$$P_i = \Sigma Img(i,j)$$

where P(i,j) is the horizontal projection of the image for row i, and the Img(i,j) is the pixel value at (i, j);

(q) a seventeenth sequence of instructions which, when executed by the processor, causes said processor, based on said baseline determination, to segment a line image to connected component images comprised of subwords of said images;

(r) an eighteenth sequence of instructions which, when executed by the processor, causes said processor to tag each said subwords with page number and line number information to facilitate storage and retrieval of said image subwords; and (s) a nineteenth sequence of instructions which, when executed by the processor, causes said processor to display image thumbnails of said image subwords matched according to said query matching process.

11. The computer software product according to claim 10, further comprising a twentieth sequence of instructions which, when executed by the processor, causes said processor to use four concentric circles thereby defining 32 said regions of intersection between said multilines and said concentric circles.

12. The computer software product according to claim 10, further comprising a twenty-first sequence of instructions which, when executed by the processor, causes said processor to normalize said count for each of said regions.

13. The computer software product according to claim 10, further comprising a twenty-second sequence of instructions which, when executed by the processor, causes said processor to calculate said predetermined distance measurement as a cosine between said query vector, and said Term-by Document matrix.

* * * * *